United States Patent
Lee et al.

(10) Patent No.: US 12,439,762 B2
(45) Date of Patent: Oct. 7, 2025

(54) STRETCHABLE ORGANIC OPTOELECTRONIC SENSORIMOTOR SYNAPSE

(71) Applicant: SEOUL NATIONAL UNIVERSITY R&DB FOUNDATION, Seoul (KR)

(72) Inventors: Tae-Woo Lee, Seoul (KR); Yeong Jun Lee, Chungcheongbuk-do (KR)

(73) Assignee: SEOUL NATIONAL UNIVERSITY R&DB FOUNDATION (KR)

(*) Notice: Subject to any disclaimer, the term of this patent is extended or adjusted under 35 U.S.C. 154(b) by 1326 days.

(21) Appl. No.: 17/100,876

(22) Filed: Nov. 21, 2020

(65) Prior Publication Data

US 2021/0175409 A1 Jun. 10, 2021

Related U.S. Application Data

(60) Provisional application No. 62/938,876, filed on Nov. 21, 2019, provisional application No. 62/938,887, filed on Nov. 21, 2019.

(51) Int. Cl.
| | | |
|---|---|---|
| H10K 10/46 | (2023.01) | |
| H10N 30/098 | (2023.01) | |
| H10N 30/80 | (2023.01) | |
| H10N 30/857 | (2023.01) | |
| H10N 70/20 | (2023.01) | |
| F03G 7/05 | (2006.01) | |
| H10K 30/30 | (2023.01) | |
| H10K 77/10 | (2023.01) | |
| H10K 85/10 | (2023.01) | |

(52) U.S. Cl.
CPC ......... *H10K 10/484* (2023.02); *H10N 30/098* (2023.02); *H10N 30/802* (2023.02); *H10N 30/857* (2023.02); *H10N 70/24* (2023.02); *F03G 7/05* (2013.01); *H10K 30/30* (2023.02); *H10K 77/111* (2023.02); *H10K 85/113* (2023.02)

(58) Field of Classification Search
CPC .. H10N 30/802; H10N 30/098; H10N 30/857; H10N 30/30; H10N 70/24; H10K 10/484; H10K 85/113; H10K 77/111; F03G 7/05
See application file for complete search history.

(56) References Cited

U.S. PATENT DOCUMENTS 5,024,223 A * 6/1991 Chow ................ A61N 1/36046
606/1
5,343,555 A * 8/1994 Yayla .................. G06N 3/0675
706/35

(Continued)

OTHER PUBLICATIONS

Lee et al., "Stretchable organic optoelectronic sensorimoter synapse", Science Advances (Year: 2018).*

(Continued)

*Primary Examiner* — Lex H Malsawma
(74) *Attorney, Agent, or Firm* — Renaissance IP Law Group LLP

(57) ABSTRACT

Disclosed within is a stretchable organic optoelectronic sensorimotor synapse including: a photodetector triggered by optical signals to generate voltage pulses; and a stretchable organic nanowire synaptic transistor (s-ONWST) driven by the voltage pulses to generate resultant informative synaptic outputs.

10 Claims, 25 Drawing Sheets

(56) References Cited

U.S. PATENT DOCUMENTS

| | | | | |
|---|---|---|---|---|
| 8,600,919 | B2* | 12/2013 | Poon | G06N 3/088 |
| | | | | 706/33 |
| 9,805,302 | B2* | 10/2017 | Kim | G06N 3/065 |
| 2004/0107172 | A1* | 6/2004 | Wang | G06N 3/063 |
| | | | | 706/40 |
| 2006/0184245 | A1* | 8/2006 | Graf | A61N 1/36046 |
| | | | | 607/54 |
| 2009/0292661 | A1* | 11/2009 | Haas | G06N 3/088 |
| | | | | 706/33 |
| 2012/0317063 | A1* | 12/2012 | Sim | G11C 13/003 |
| | | | | 706/27 |
| 2018/0083212 | A1* | 3/2018 | Yoon | H10K 10/468 |

OTHER PUBLICATIONS

Shim et al., "Stretchable elastic synaptic transistors for newrologically integrated soft engineering systems" Science Advances (Year: 2019).*

* cited by examiner

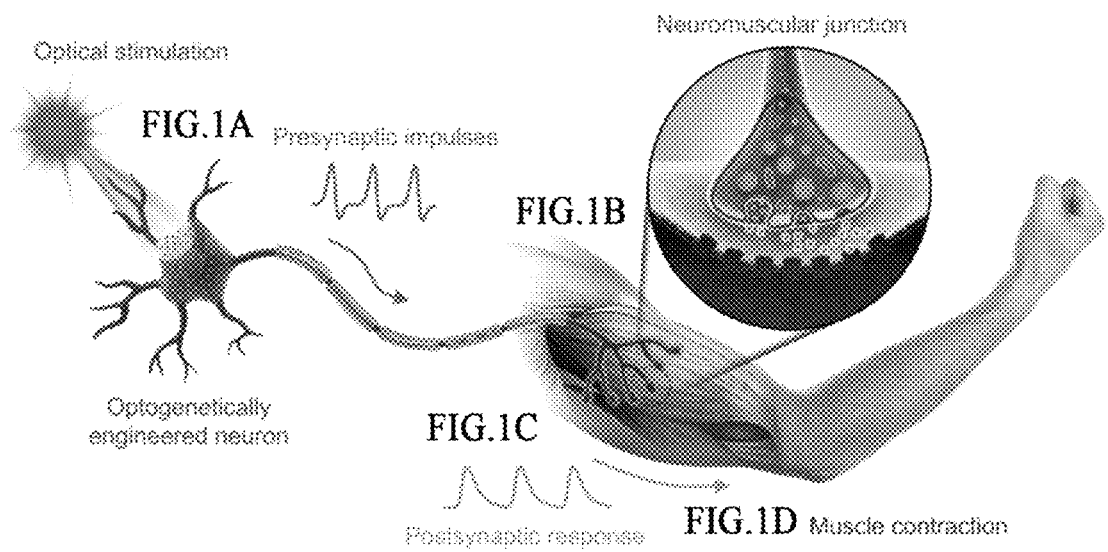
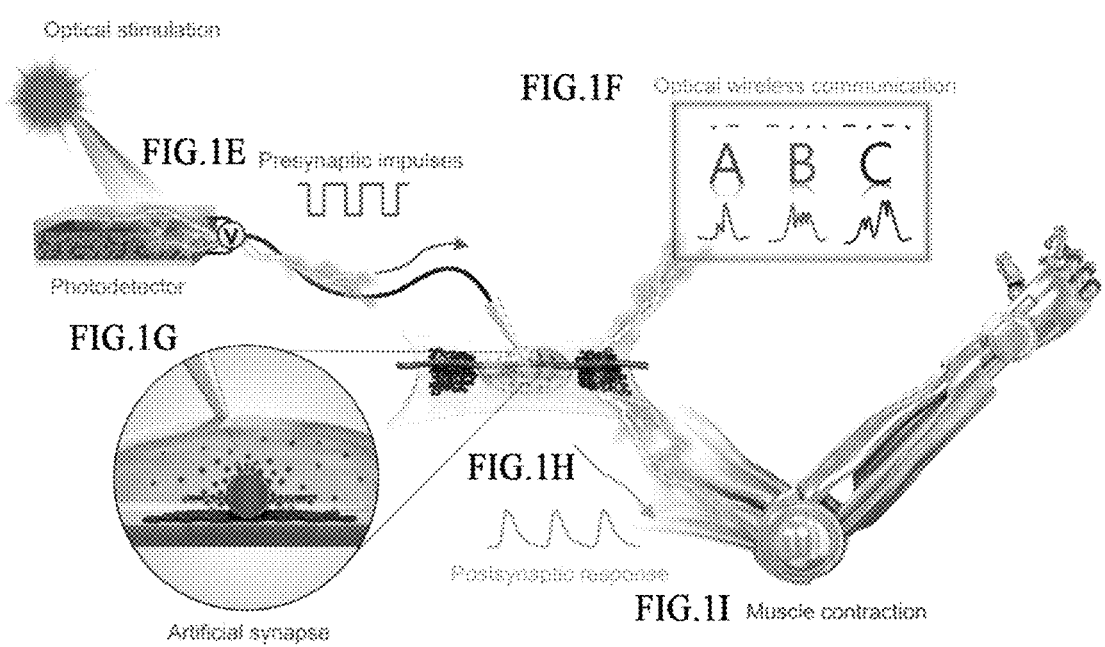

FIG.2

Table 1

|  | Biological system | Artificial system |
|---|---|---|
| Sensorimotor neuron | Presynaptic membrane | Gate electrode |
|  | Presynaptic potential | Gate voltage |
|  | Photosensitive protein | Photodetector |
| Neuromuscular junction | Synaptic cleft | Ion gel electrolyte |
|  | Neurotransmitter | Anion |
| Skeletal muscle | Postsynaptic membrane | ONW |
|  | Postsynaptic potential | Drain current |
|  | Muscle fiber | Polymer actuator |

FIG.3A

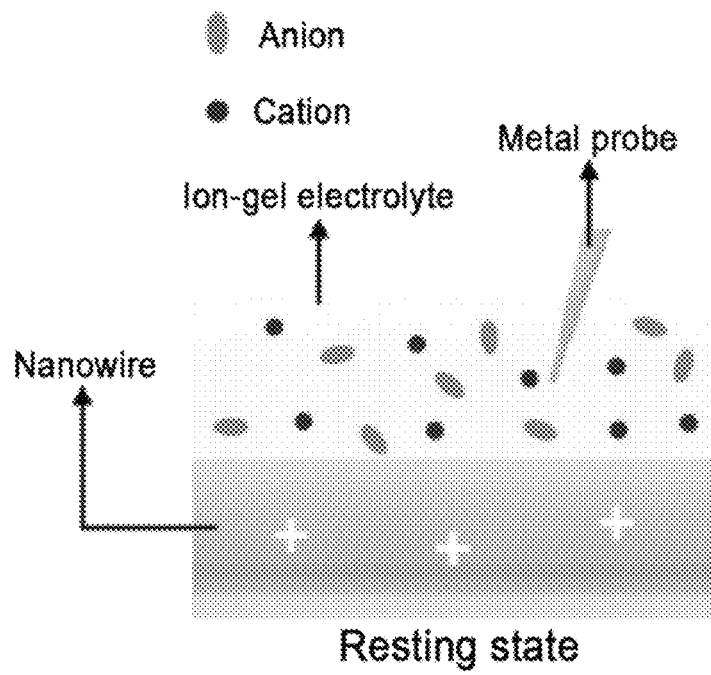

Voltage spike applied | After spike

Repeated voltage spikes applied | After spikes

Table 2

| Strain (%) | Length direction | | Width direction | |
|---|---|---|---|---|
| | Maximum drain current (-μA) | Mobility (cm$^2$·V$^{-1}$·s$^{-1}$) | Maximum drain current (-μA) | Mobility (cm$^2$·V$^{-1}$·s$^{-1}$) |
| 0 | 1.50 | 3.54 | 1.19 | 1.58 |
| 25 | 1.37 | 3.00 | 1.00 | 1.79 |
| 50 | 1.60 | 2.93 | 0.83 | 1.62 |
| 75 | 1.62 | 2.50 | 1.37 | 1.61 |
| 100 | 1.68 | 2.86 | 1.58 | 1.32 |

Table 3

| Number of stretches | Length direction | | Width direction | |
|---|---|---|---|---|
| | Maximum drain current (-µA) | Mobility (cm$^2 \cdot$V$^{-1} \cdot$s$^{-1}$) | Maximum drain current (-µA) | Mobility (cm$^2 \cdot$V$^{-1} \cdot$s$^{-1}$) |
| 1 | 1.26 | 2.31 | 1.11 | 1.54 |
| 5 | 1.19 | 2.31 | 1.71 | 1.68 |
| 10 | 1.36 | 3.00 | 1.93 | 2.18 |
| 20 | 1.18 | 2.39 | 2.61 | 1.74 |
| 30 | 1.08 | 2.18 | 2.60 | 1.69 |
| 50 | 1.14 | 1.94 | 1.54 | 1.18 |

Table 4

| Number of spikes | Displacement (mm) | Output voltage (V) |
| --- | --- | --- |
| 0 | 0.39 | ~1[a] |
| 10 | 1.50 | 1.33 |
| 30 | 2.06 | 1.96 |
| 50 | 2.50 | 2.68 |
| 60 | 2.72 | 3.20 |

STRETCHABLE ORGANIC OPTOELECTRONIC SENSORIMOTOR SYNAPSE

CLAIM FOR PRIORITY

This application claims priority to U.S. Provisional Application No. 62/938,887 filed on Nov. 21, 2019, and U.S. Provisional Application No. 62/938,876 filed on Nov. 21, 2019 in the United States Patent and Trademark Office (USPTO), the entire contents of which are hereby incorporated by reference.

BACKGROUND

1. Technical Field

Example embodiments of the present invention relates in general to a stretchable organic optoelectronic sensorimotor synapse.

2. Description of the Related Art

Our human body performs not only myriads of sensing functions including external stimuli (light, pressure, temperature, and humidity) and biological signals (pulse pressure, cardiac signals, and brainwaves) but also both neural signal processing and motor responses. All signals involved in these processes are transferred through synapses and synergistically combined to complete the complicated human neural system. By mimicking biological synapses in the human sensorimotor nervous system, a neurologically inspired electronic synapse that processes neural signals received from artificial sensory organs and produces informative synaptic responses and motor outputs can be a critical element for an artificial sensorimotor nervous system of bioinspired soft electronics and neurorobotics.

Organic artificial synapses represent a viable approach to developing neurologically inspired electronic devices by emulating biological synapses with the distinctive advantages of (i) extremely low energy consumption and (ii) high robustness in their mechanical flexibility.

To date, however, the development of organic artificial synapses remains rudimentary because most research has focused only on the development of materials and individual devices to emulate synaptic responses and memory properties in a brain. Mimicking complicated biological sensory and motor synapses in the human body has remained a daunting challenge.

Light cognition is an important sensory function for bioinspired electronics, for example, an artificial visualization system. In addition, light-driven operation of an artificial sensory system combined with motor control enables the development of optical wireless control of bioinspired soft electronics. Moreover, this light cognition by artificial sensorimotor synapses facilitates optical wireless operation, communication, and information transmission of soft robotics in the future ubiquitous environment. In particular, a self-powered light sensory synapse will enable low-energy operation of neurologically inspired electronics.

Emulation of human sensory and motor functions becomes a core technology in bioinspired electronics for next generation electronic prosthetics and neurologically inspired robotics. An electronic synapse functionalized with an artificial sensory receptor and an artificial motor unit can be a fundamental element of bioinspired soft electronics.

SUMMARY

Accordingly, example embodiments of the present invention are provided to substantially obviate one or more problems due to limitations and disadvantages of the related art.

Example embodiments of the present invention provide an organic optoelectronic sensorimotor synapse that is based on a stretchable organic nanowire synaptic transistor (s-ONWST) to perceive and propagate optical sensory inputs and to generate informative synaptic responses and subsequent motor outputs.

Specifically, this sensorimotor synapse combined with a photodetector converts patterned optical stimuli into potentiated synaptic responses through the s-ONWST to conduct optical wireless communication of light fidelity and forms an artificial neuromuscular junction to activate artificial muscle actuator with biomimetic muscular contraction mechanism, which cannot be achieved by conventional direct operation of the artificial muscle actuator. We believe that our organic optoelectronic sensorimotor synapse would open a new era of bioinspired electronics for next-generation prosthetics and neurorobotics.

In some example embodiments, a stretchable organic optoelectronic sensorimotor synapse comprises: a photodetector triggered by optical signals to generate voltage pulses; and a stretchable organic nanowire synaptic transistor (s-ONWST) driven by the voltage pulses to generate resultant informative synaptic outputs.

In some example embodiments, wherein the s-ONWST, combined with the photodetector being self-powered, converts patterned optical stimuli into potentiated synaptic responses to conduct optical wireless communication of light fidelity.

In some example embodiments, wherein the s-ONWST, combined with the photodetector being self-powered, converts patterned optical stimuli into potentiated synaptic responses to forms an artificial neuromuscular junction to activate artificial muscle actuator with biomimetic muscular contraction mechanism.

In some example embodiments, wherein the s-ONWSTs provides stable I-V characteristics and typical postsynaptic behaviors, including EPSC, PPF, SVDP, SNDP, SI-DP, and high-pass filtering at both 0 and 100% strains.

In some example embodiments, wherein the photodetector is stimulated by optical pulses of wavelengths in infrared, visible, and ultraviolet regions, the s-ONWSTs generates typical excitatory postsynaptic currents (EPSCs) when triggered by patterns of optical signals as presynaptic impulses, and optical wireless signals for the wireless communication subsequently generate output voltage pulses that are applied to s-ONWSTs as presynaptic spikes to trigger EPSCs.

In some example embodiments, wherein the s-ONWSTs comprises: a gate electrode electrically connected to the photodetector; organic nanowires; and an ion-gel electrolyte between the gate electrode and the organic nanowires, wherein presynaptic electrical impulse was transmitted from the gate electrode to the organic nanowires (ONWs), and the impulse transmission is a consequence of ion migration in the ion-gel electrolyte that generates postsynaptic electrical responses.

In some example embodiments, wherein patterned light signals can successfully convey Morse code onto the s-ONWST.

In some example embodiments, wherein the s-ONWST emulates a motor neuron and a neuromuscular junction, the ONW has similar morphology to the biological neuron, which has a thin and flexible axon, the gate electrode mimics the presynaptic membrane, and the ion-gel electrolyte mimics the synaptic cleft.

In some example embodiments, wherein presynaptic gate voltage spike induces migration of mobile anions near the ONW surface, which corresponds to the postsynaptic membrane, the accumulated anions attract holes to the ONW where they increase the excitatory postsynaptic current (EPSC) that flows between source and drain electrodes, when a single short spike voltage is applied, a sharp EPSC peak is triggered, which decays to a resting current, if several spikes are applied in quick succession, ions accumulate near the surface of ONW, so EPSC increases gradually, and after spikes, accumulated anions spread back and become dispersed randomly in the electrolyte, as a result, the original resting current is restored.

In some example embodiments, wherein an artificial synaptic cleft of the ion gel electrolyte is ionically conducting and electronically insulating, so the ions can migrate to the ONW channel upon presynaptic gate voltage spikes to result in an increase in postsynaptic drain current.

BRIEF DESCRIPTION OF THE DRAWINGS

Example embodiments of the present invention will become more apparent by describing in detail example embodiments of the present invention with reference to the accompanying drawings, in which:

FIG. 1A is a view illustrating a case in which light stimulates a biological motor neuron that has photosensitive protein expression, and an action potential is thus generated;

FIG. 1B is a view illustrating a case in which a chemical synapse of a neuromuscular junction transmits the potentials to a muscle fiber;

FIG. 1C is a view illustrating a postsynaptic response;

FIG. 1D is a view illustrating a case which causes the muscle to contract;

FIG. 1E is a view illustrating a case in which light triggers a photodetector to generate output voltage spikes;

FIG. 1F is a view illustrating an optical wireless communication via organic optoelectronic synapse with patterned light signals representing the International Morse code of "ABC";

FIGS. 1G and 1H are views illustrating a case in which the voltage spikes produce electrical postsynaptic signals from an s-ONWST to activate an artificial muscle actuator;

FIG. 1I is a view illustrating a case in which the artificial muscle then contracts;

FIG. 2 is Tablet illustrating Comparison and optical neuromuscular electronic system;

FIG. 3A is a view illustrating a case in which during the resting stage, anions and cations are randomly distributed in ion-gel electrolyte;

DETAILED DESCRIPTION OF EXAMPLE EMBODIMENTS

Figure 3B:
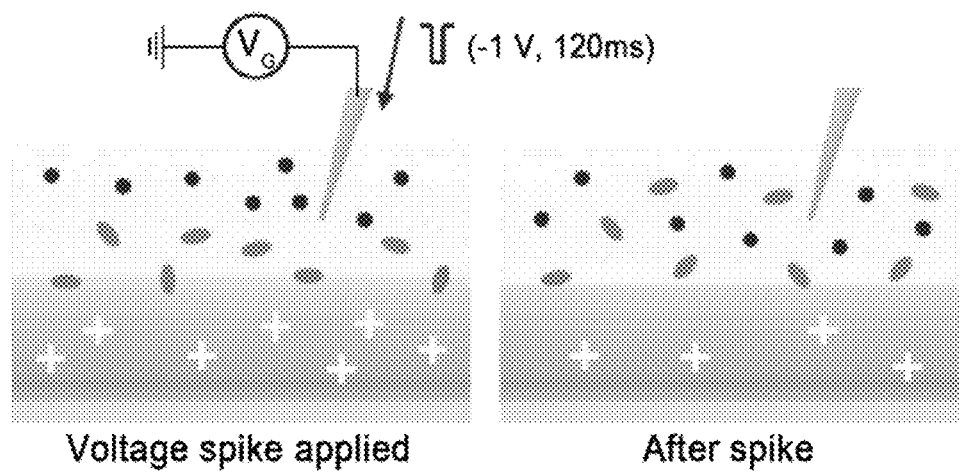
FIG. 3B is a view illustrating a case in which with a gate voltage spike, a few anions migrate to near the surface of the ONW and induce holes in ONW temporally, so a brief EPSC develops.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Here, we (inventors) report a stretchable organic optoelectronic sensorimotor synapse that uses an organic optoelectronic synapse and a neuromuscular system based on a stretchable organic nanowire synaptic transistor (s-ONWST). The voltage pulses of a self-powered photodetector triggered by optical signals drive the s-ONWST, and resultant informative synaptic outputs are used not only for optical wireless communication of human-machine interfaces but also for light-interactive actuation of an artificial muscle actuator in the same way that a biological muscle fiber contracts. Our stretchable organic optoelectronic sensorimotor synapse suggests a promising strategy toward developing bioinspired soft electronics, neurologically inspired robotics, and electronic prostheses.

Design of Organic Optoelectronic Synapse and Neuromuscular System

FIGS. 1A to 1D illustrate biological and organic optoelectronic synapse and neuromuscular electronic system in a biological system. FIG. 1A is a view illustrating a case in which light stimulates a biological motor neuron that has photosensitive protein expression, and an action potential is thus generated. FIG. 1B is a view illustrating a case in which a chemical synapse of a neuromuscular junction transmits the potentials to a muscle fiber. FIG. 1C is a view illustrating a postsynaptic response. FIG. 1D is a view illustrating a case which causes the muscle to contract. FIGS. 1E to 1I are analogous views to FIGS. 1A to 1D in an organic artificial system. FIG. 1E is a view illustrating a case in which light triggers a photodetector to generate output voltage spikes. FIG. 1F is a view illustrating an optical wireless communication via organic optoelectronic synapse with patterned light signals representing the International Morse code of "ABC". FIGS. 1G and 1H are views illustrating a case in which the voltage spikes produce electrical postsynaptic signals from an s-ONWST to activate an artificial muscle actuator. FIG. 1I is a view illustrating a case in which the artificial muscle then contracts.

In optogenetics, the contraction of biological muscle fibers can be controlled by optical stimulation of motor neurons that are genetically modified to be photosensitive (FIG. 1A). This approach is promising to restore the motor function of defective neuromuscular systems. A biological neuromuscular junction (FIG. 1B) is a chemical synapse that transmits presynaptic action potentials from lower motor neurons (α-motor neurons) to the adjacent skeletal muscle fibers by delivering the neurotransmitter acetylcholine to generate excitatory postsynaptic potentials (FIG. 1C), ultimately resulting in muscle contraction (FIG. 1D). To realize a bioinspired movement system like that of humans, development of a neuromuscular electronic system is necessary.

In some example embodiments, organic optoelectronic synapse generates typical excitatory postsynaptic currents (EPSCs) when triggered by various patterns of optical signals as presynaptic impulses. A photodetector is stimulated by optical pulses of various wavelengths in infrared, visible, and ultraviolet regions (FIG. 1E). The optical wireless signals subsequently generate output voltage pulses that are applied to s-ONWSTs as presynaptic spikes to trigger EPSCs. By converting optical signals of the International Morse code to distinct EPSC signals, the organic optoelectronic synapse provides an optical wireless communication method for human-machine interfaces (FIG. 1F).

The s-ONWST also constitutes a neuromuscular electronic system, along with an artificial muscle actuator, to realize an artificial motor nervous system by mimicking a biological neuromuscular system. A presynaptic electrical impulse was similarly transmitted from a gate electrode to organic nanowires (ONWs; FIG. 1E). This transmission is a consequence of ion migration in the electrolyte (FIG. 1G) that generates postsynaptic electrical responses (FIG. 1H) that can control our artificial muscles (FIG. 1I).

FIG. 2 is Tablet illustrating Comparison and optical neuromuscular electronic system.

The artificial optical sensorimotor system is composed of components that correspond to each component of the biological system (Table 1).

Neuromuscular Junction and Stretchable Organic Nanowire Synaptic Transistor (s-ONWST)

Figure 3C:
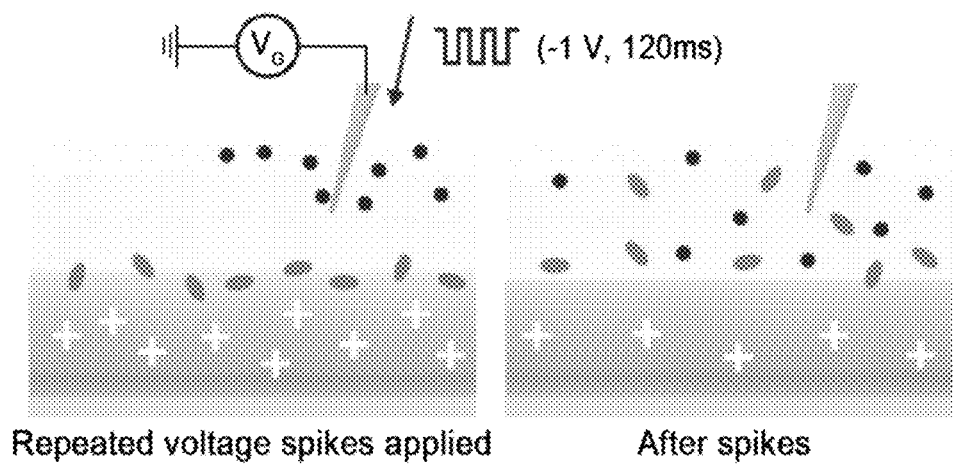
FIG. 3C is a view illustrating a case in which with repeated gate voltage spikes, an increasing number of anions accumulate near the surface of the ONW and attract holes in the ONW, so EPSC increases.

FIGS. 3A to 3C are views illustrating Working mechanism of s-ONWST. FIG. 3A is a view illustrating a case in which during the resting stage, anions and cations are randomly distributed in ion-gel electrolyte. FIG. 3B is a view illustrating a case in which with a gate voltage spike, a few anions migrate to near the surface of the ONW and induce holes in ONW temporally, so a brief EPSC develops. After the spike, ions diffuse back to the original equilibrium state and the current decays to the resting state. FIG. 3C is a view illustrating a case in which with repeated gate voltage spikes, an increasing number of anions accumulate near the surface of the ONW and attract holes in the ONW, so EPSC increases. Some anions may migrate a short distance into the ONW. After spikes, ions diffuse back to the equilibrium state and the current decays to the resting state.

A neuromuscular system is composed of a lower motor neuron and skeletal muscle fibers; it enables contraction of skeletal muscles. At a neuromuscular junction between a motor neuron and a muscle fiber, an action potential reaches an axon terminal which is a presynaptic membrane that releases the neurotransmitter acetylcholine through a chemical synapse. Acetylcholine binds to a receptor on a postsynaptic membrane of a muscle cell, and stimulates opening of relevant ion channels that allow ions to flow across the membrane of the muscle tissue. This depolarization of muscle fiber generates a postsynaptic potential that results in muscle contraction. Acetylcholine is the only neurotransmitter in the neuromuscular junction, so only excitatory postsynaptic potential (EPSP) activates muscle contraction.

In some example embodiments, neuromuscular electronic system, s-ONWST emulates the motor neuron and the neuromuscular junction. A buckled ONW has similar morphology to the biological neuron, which has a thin and flexible axon. The gate mimics the presynaptic membrane and ion-gel electrolyte mimics the synaptic cleft. Presynaptic gate voltage spike induces migration of mobile anions near the ONW surface, which corresponds to the postsynaptic membrane.

The accumulated anions attract holes to the ONW; they increase the excitatory postsynaptic current (EPSC) that flows between source and drain electrodes. When a single short spike voltage is applied, a sharp EPSC peak is triggered, which decays to a resting current. If several spikes are applied in quick succession, ions accumulate near the surface of ONW, so EPSC increases gradually. After spikes, accumulated anions spread back and become dispersed randomly in the electrolyte; as a result, the original resting current is restored.

The artificial synaptic cleft of the ion gel electrolyte is ionically conducting and electronically insulating, so the ions can migrate to the ONW channel upon presynaptic gate voltage spikes to result in an increase in postsynaptic drain current (FIGS. 3A to 3C). Thus, In some example embodiments, optical sensory neuromuscular electronic system enables wireless activation of artificial muscle and thereby facilitates optical wireless control of soft electronic devices.

Fabrication and Electrical Characteristics of s-ONWST

Figure 4A:
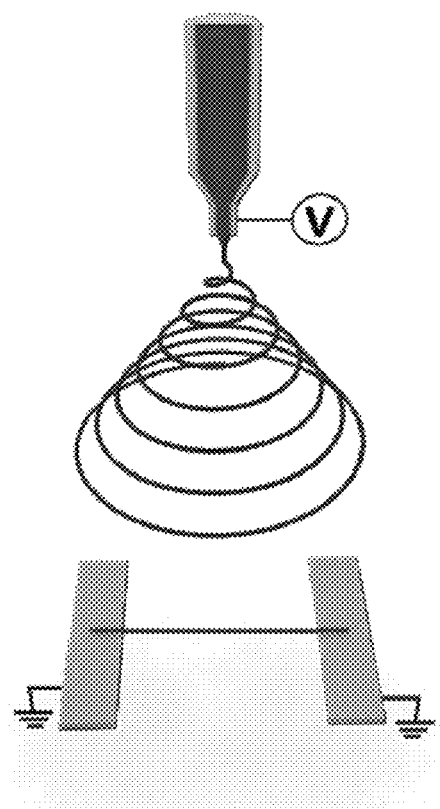
FIG. 4A is a view illustrating Electrospinning of an aligned single ONW using parallel electrodes.
Figure 4B:
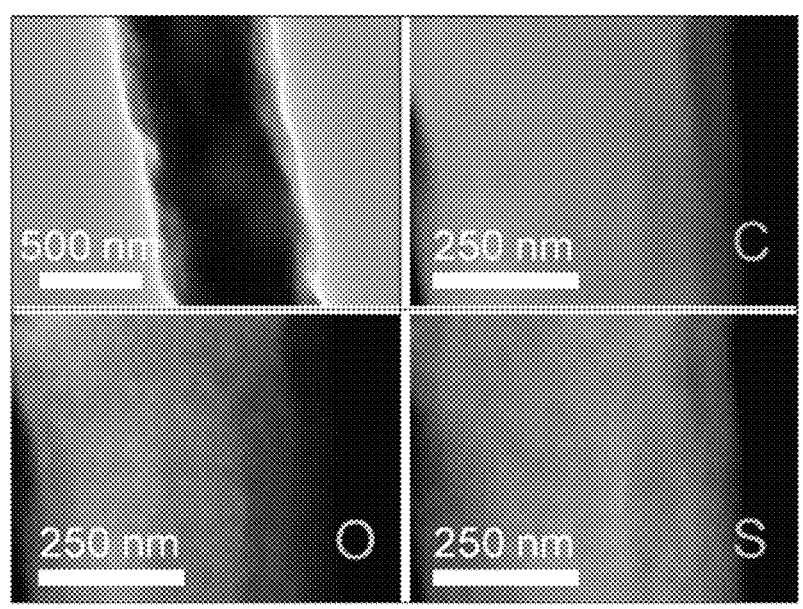
FIG. 4B is a view illustrating Transmission electron microscopy image and energy-dispersive X-ray spectroscopy mapping of ONW.
Figure 4C:
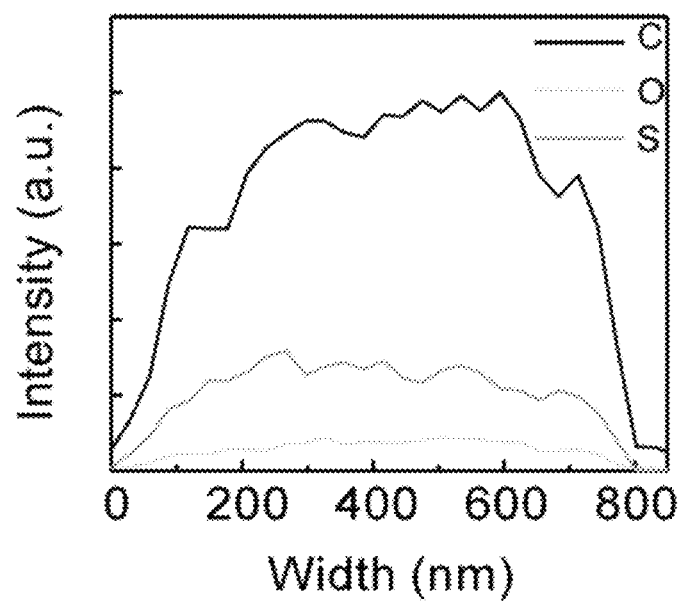
FIG. 4C is a view illustrating Line profile for chemical elements of ONW.
Figure 4D:
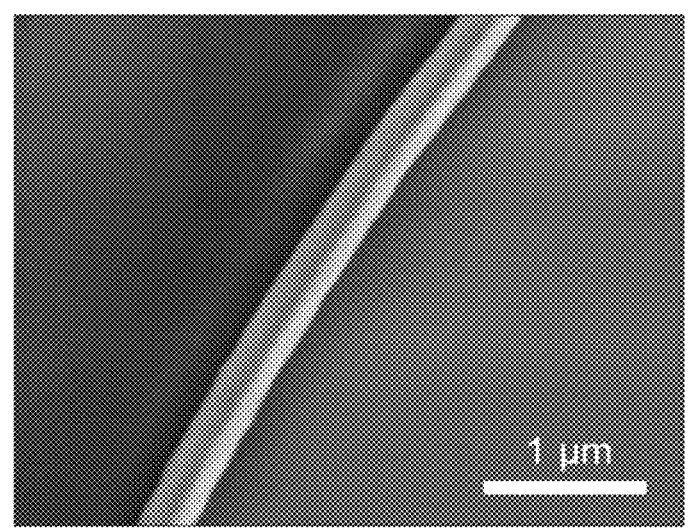
FIG. 4D is a view illustrating Scanning electron microscopy image of ONW.
Figure 4E:
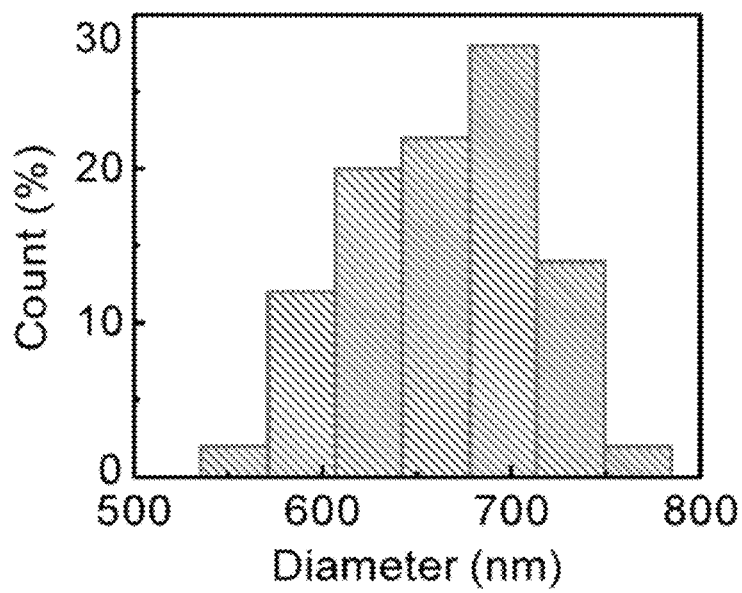
FIG. 4E is a view illustrating Diameter distribution of ONW.

FIGS. 4A to 4E are views illustrating Fabrication and morphology of ONW. FIG. 4A is a view illustrating Electrospinning of an aligned single ONW using parallel electrodes. FIG. 4B is a view illustrating Transmission electron microscopy image and energy-dispersive X-ray spectroscopy mapping of ONW (red: carbon, orange: oxygen, green: sulfur). FIG. 4C is a view illustrating Line profile for chemical elements of ONW (black: carbon, red: oxygen, blue: sulfur). ONW has homogenous chemical composition. FIG. 4D is a view illustrating Scanning electron microscopy image of ONW. FIG. 4E is a view illustrating Diameter distribution of ONW. Average diameter was 664 (s.d. 47) nm.

We hypothesize that biomimetic soft electronics that are both flexible and stretchable should be a viable approach for "soft" neurorobotic applications. Specifically, we aim to develop organic artificial synaptic devices that (i) can mimic the "flexible and winding" fibril morphology of biological neurons and (ii) are mechanically stretchable and durable under various motions related to bending, folding, twisting, and stretching of soft electronics.

These two attributes have been difficult to achieve using conventional rigid inorganic artificial synapses.

ONWs can be readily fabricated by electrospinning with parallel electrodes (FIGS. 4A to 4E). The ONW was composed of a homogeneous mixture of fused thiophene diketopyrrolopyrrole (FT4-DPP)-based conjugated polymer and polyethylene oxide [PEO (7:3, w/w); FIGS. 4B and 4C] and had an average diameter of 664 nm (SD=47 nm; FIGS. 4D and 4E). Inclusion of a small amount of high-molecular weight polymer PEO (MW: 400,000 g/mol) prevents wire breakage, generates continuous ONWs, and improves ion transportation in the ONW.

FIGS. 5A to 5D are views illustrating fabrication and electrical characteristics of s-ONWST.

Figure 5A:
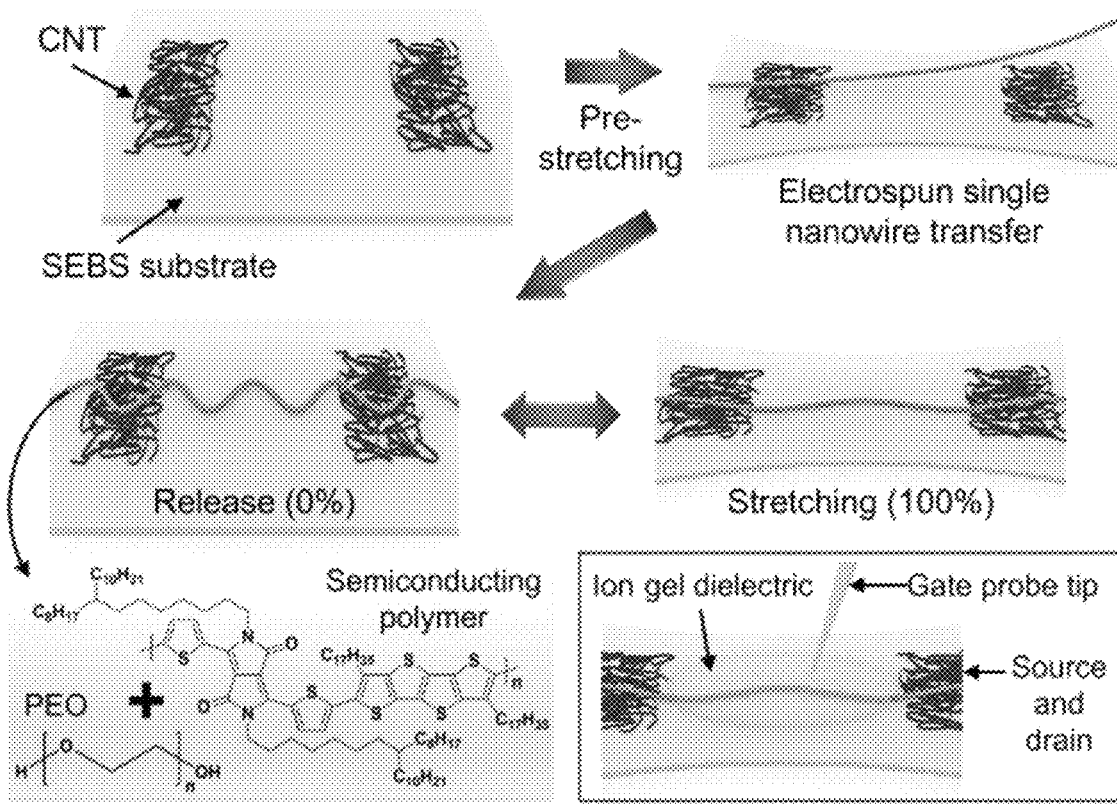
FIG. 5A is a view illustrating fabrication procedure of s-ONWST based on a single ONW.
Figure 5B:
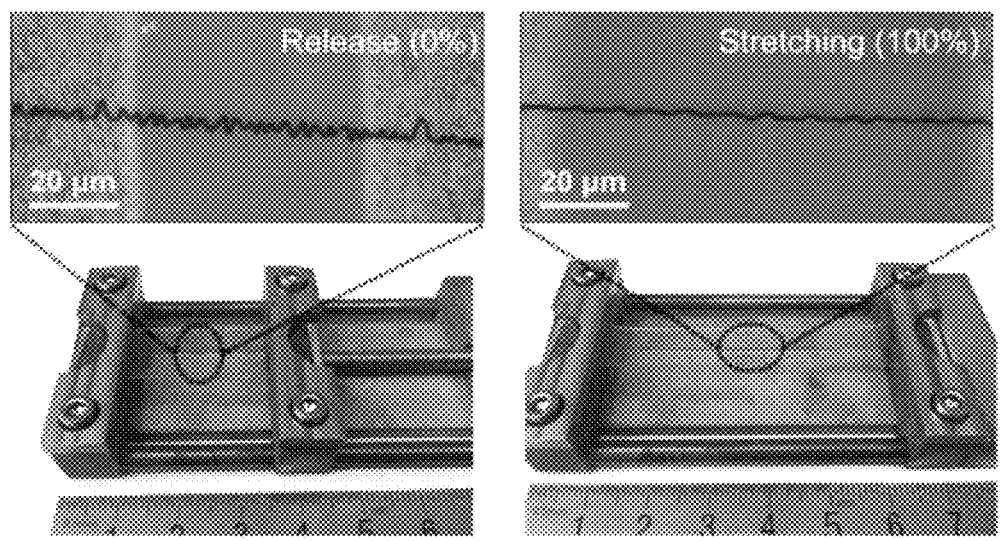
FIG. 5B is a view illustrating Optical microscopy image of a wavy NW stretched from 0 to 100% strain.
Figure 5C:
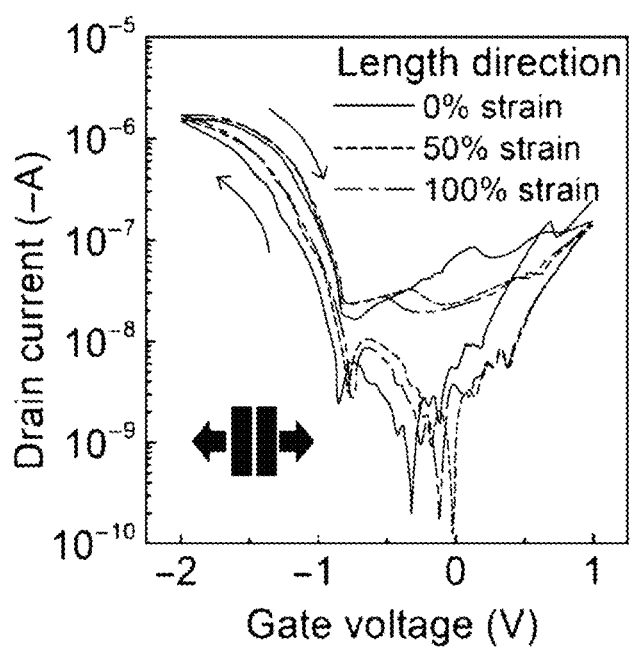
FIG. 5C is a view illustrating I-V characteristics of s-ONWST at 0, 50, and 100% strains.
Figures 5D, 6:
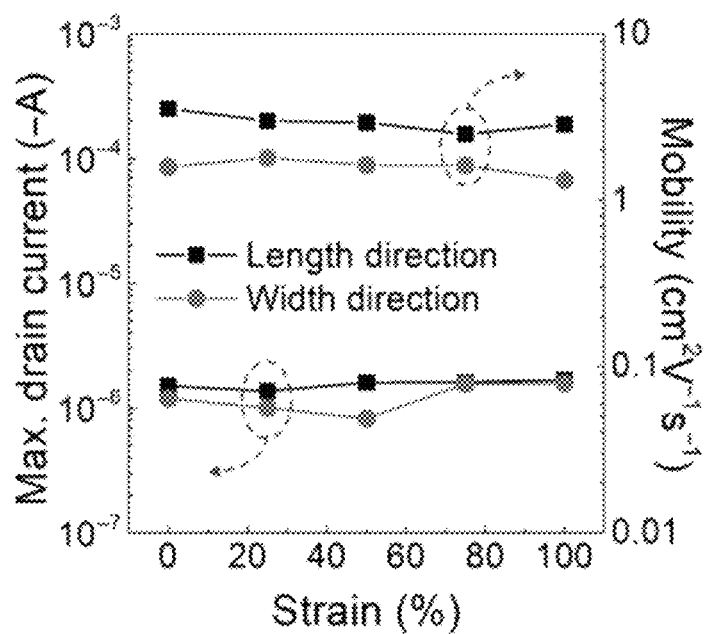
FIG. 5D is a view illustrating maximum drain current and mobility as a function of various strains along the channel length and width directions.
FIG. 6 is Table 2 illustrating Summary of electrical characteristics of s-ONWST as function of strain in channel length and width directions.

FIG. 5A is a view illustrating fabrication procedure of s-ONWST based on a single ONW. An electrospun single ONW was first transferred onto prestretched rubbery SEBS substrate and subsequently buckled when the film contracted after the strain was released. FIG. 5B is a view illustrating Optical microscopy image of a wavy NW stretched from 0 to 100% strain. FIG. 5C is a view illustrating I-V characteristics of s-ONWST at 0, 50, and 100% strains. Blue arrows indicate clockwise hysteresis. FIG. 5D is a view illustrating maximum drain current and mobility as a function of various strains along the channel length and width directions.

A single nanowire (NW) was transferred onto 100% prestrained styrene ethylene butylene styrene (SEBS) rubbery substrate on which carbon nanotube (CNT) source and drain (S/D) electrodes (FIG. 5A) had been patterned.

After the strain was released, the elastic substrate contracted and the ONW became wavy; it retained this configuration after repeated stretching to 100% strain (FIG. 5B).

With a high capacitance ion gel electrolyte, s-ONWSTs were fabricated (see Materials and Methods). In current-voltage (I-V) curves, the transistor showed the typical behavior of ion gel-based electrochemical transistors (FIG. 5C).

The formation of an electric double layer at the gate-electrolyte interface and the electrolyte-semiconductor interface resulted in a behavior similar to biological synaptic plasticity. The FT4-DPP-based polymer NW displayed both small hysteresis and short memory retention and is therefore a suitable candidate to mimic the short build and decay times (<1 s) of biological sensorimotor synapses. Our previously reported poly(3-hexylthiophene-2,5-diyl) (P3HT) NW had large hysteresis and relatively long memory retention and was therefore not suitable to emulate biological sensorimotor synapses.

FIG. 6 is Table 2 illustrating Summary of electrical characteristics of s-ONWST as function of strain in channel length and width directions.

Figures 7, 8A:
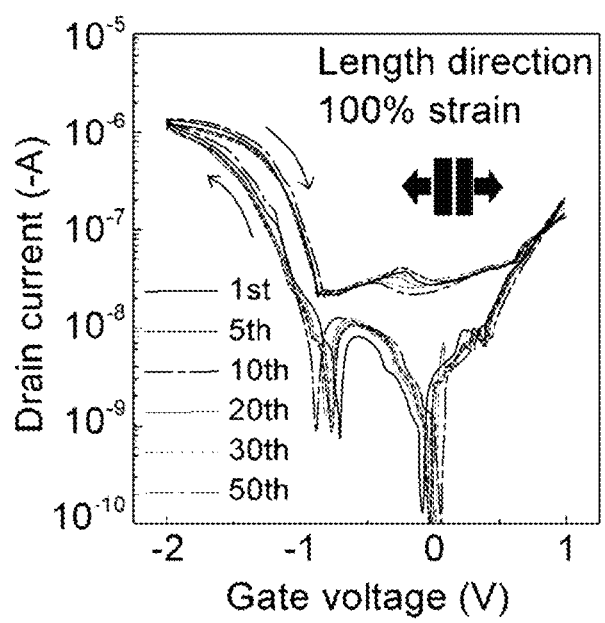
FIG. 7 is Table 3 illustrating Summary of electrical characteristics of s-ONWST after stretching cycles at 100% strain in channel length and width directions.
FIG. 8A is a view illustrating I-V characteristics of s-ONWST after stretching cycles at 100% strain.

FIG. 7 is Table 3 illustrating Summary of electrical characteristics of s-ONWST after stretching cycles at 100% strain in channel length and width directions.

Figure 8B:
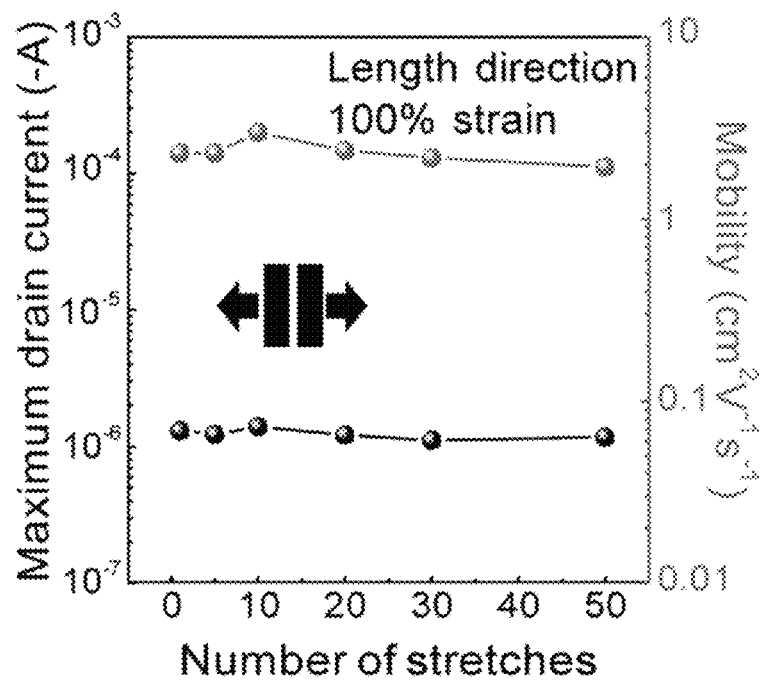
FIG. 8B is a view illustrating Maximum drain current and mobility after stretching cycles at 100% strain along the channel length direction.
Figure 8C:
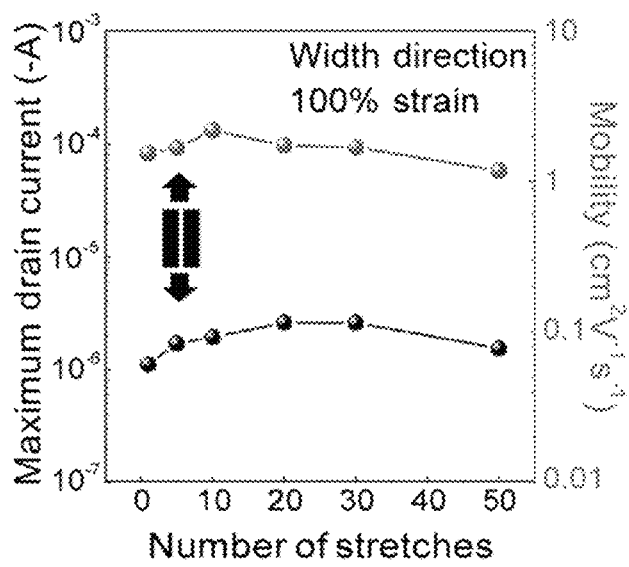
FIG. 8C is a view illustrating Maximum drain current and mobility after stretching cycles at 100% strain along the channel width directions.

FIGS. 8A to 8C are views illustrating Electrical characteristics of s-ONWST.

FIG. 8A is a view illustrating I-V characteristics of s-ONWST after stretching cycles at 100% strain. Blue arrows: clockwise hysteresis. FIG. 8B is a view illustrating Maximum drain current and mobility after stretching cycles at 100% strain along the channel length direction. FIG. 8C is a view illustrating Maximum drain current and mobility after stretching cycles at 100% strain along the channel width directions.

In some example embodiments, s-ONWSTs, the maximum drain current (~1 μA) and the carrier mobility were maintained up to 100% strain along both the channel length and width directions (FIG. 5D and FIG. 6). These electrical properties were unaffected even after 50 cycles at 100% strain in both directions (FIGS. 8A to 8C and FIG. 7).

Synaptic Characteristics of s-ONWST

FIGS. 9A to 9G are views illustrating synaptic characteristics of s-ONWST.

Figure 9A:
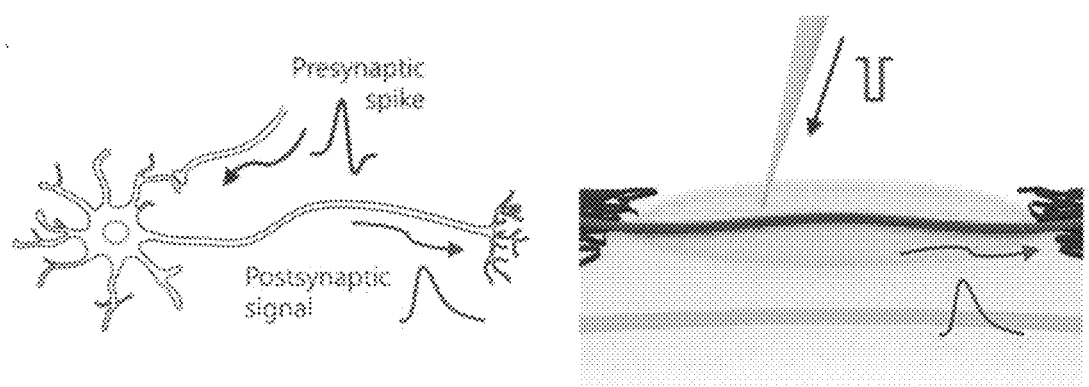
FIG. 9A is a view illustrating neural signal transmission from preneuron to postneuron through a biological synapse (top) and an artificial synapse (bottom)
Figure 9B:
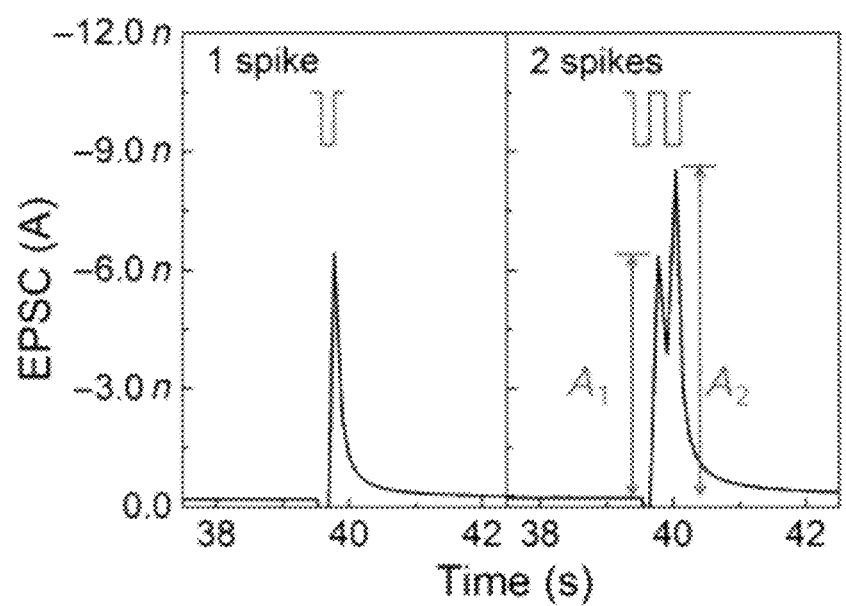
FIG. 9B is a view illustrating EPSCs triggered by single and double spikes (each spike: −1 V, 120 ms)

FIG. 9A is a view illustrating neural signal transmission from preneuron to postneuron through a biological synapse (top) and an artificial synapse (bottom). FIG. 9B is a view illustrating EPSCs triggered by single and double spikes (each spike: −1 V, 120 ms). A1 and A2 are EPSCs of the first and second spikes, respectively, separated by Δt=120 ms.

Figure 9C:
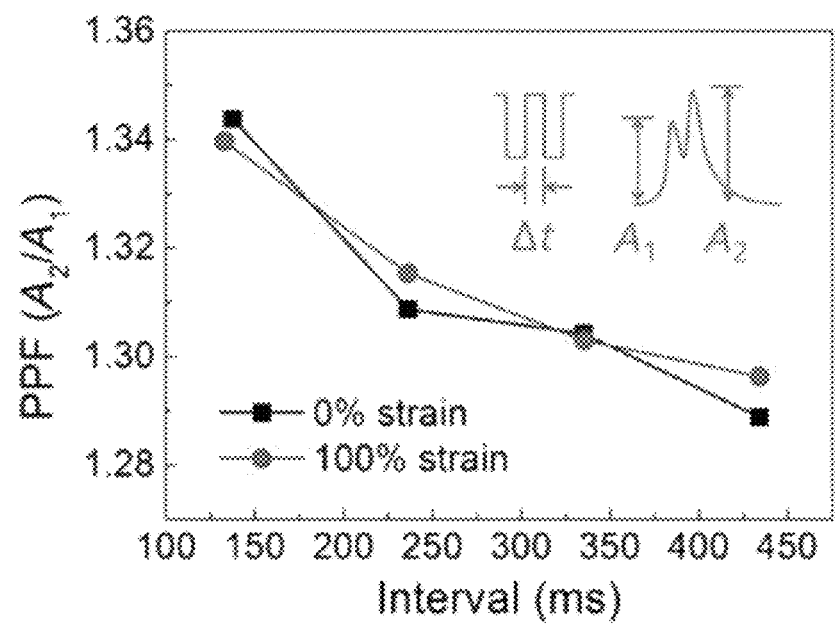
FIG. 9C is a view illustrating PPF (A2/A1) as a function of 120≤Δt≤920 ms.
Figure 9D:
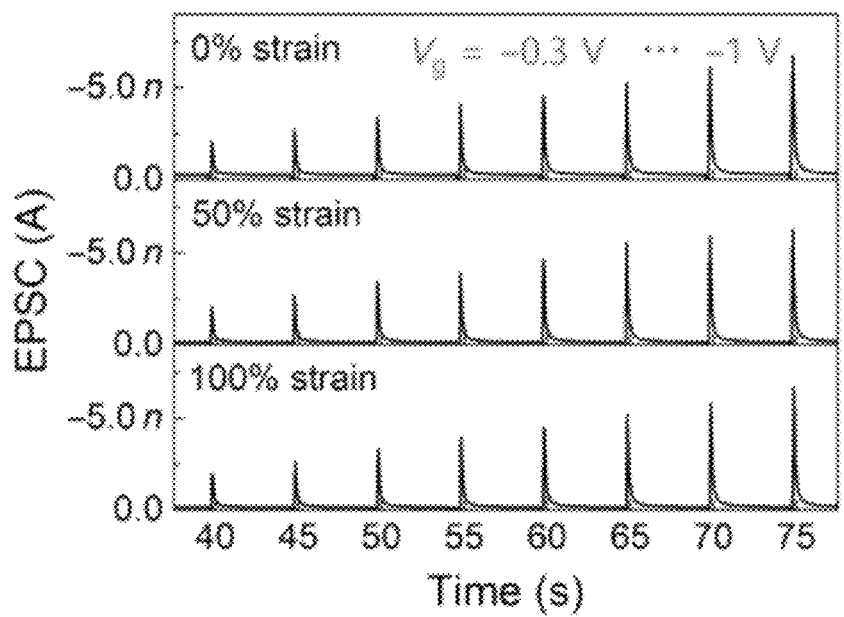
FIG. 9D is a view illustrating spike voltage-dependent plasticity (SVDP) with various gate voltages from −0.3 to −1 V.
Figure 9E:
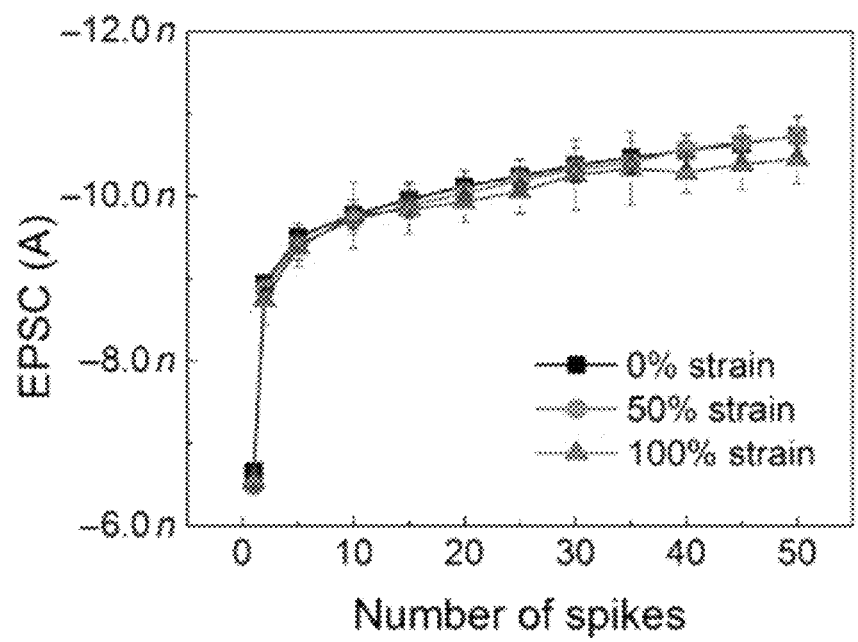
FIG. 9E is a view illustrating spike number-dependent plasticity (SNDP) with 1 to 50 spikes.

FIGS. 9C to 9E are views illustrating postsynaptic characteristics of stretched artificial synapse from 0 to 100% strains.

FIG. 9C is a view illustrating PPF (A2/A1) as a function of 120≤Δt≤920 ms. FIG. 9D is a view illustrating spike voltage-dependent plasticity (SVDP) with various gate voltages from −0.3 to −1 V. FIG. 9E is a view illustrating spike number-dependent plasticity (SNDP) with 1 to 50 spikes.

Figure 9F:
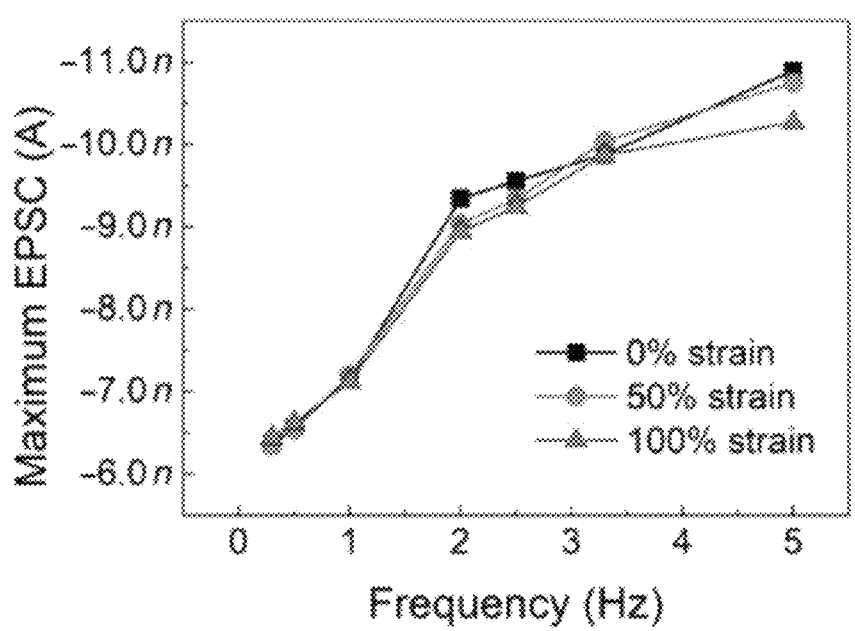
FIG. 9F is a view illustrating maximum EPSCs.
Figure 9G:
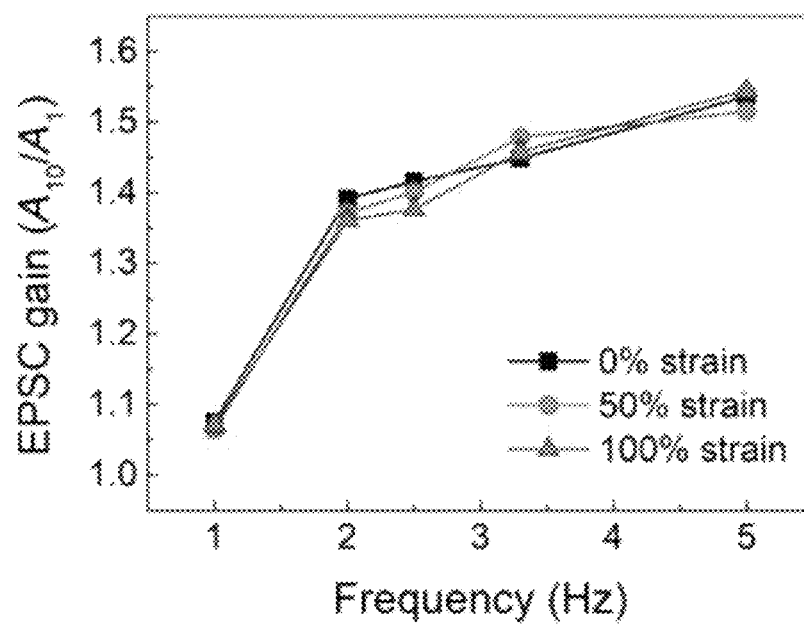
FIG. 9G is a view illustrating EPSC gain (A10/A1) of stretched artificial synapse from 0 to 100% strains.

FIGS. 9F and 9G are views illustrating spike frequency-dependent plasticity (SFDP) characteristics with spike frequency from 0.3 to 5 Hz.

FIG. 9F is a view illustrating maximum EPSCs. FIG. 9G is a view illustrating EPSC gain (A10/A1) of stretched artificial synapse from 0 to 100% strains.

In some example embodiments, artificial synapse based on ion gel-gated electrochemical transistor emulates a biological synapse in a sensorimotor nervous system (FIG. 9A). In biological synapses, action potentials from the presynaptic neuron are transferred to the postsynaptic neuron by migration of neurotransmitters across the synaptic cleft. These neurotransmitters at the receptors on postsynaptic membrane then induce postsynaptic signals. Similarly, in some example embodiments, device, the negative presynaptic voltage spikes attract temporary accumulation of anions near the surface of the ONW; this anion accumulation subsequently induces a hole-transporting channel in the ONW and results in an EPSC with the needed driving voltage (FIGS. 3A to 3C).

A single presynaptic spike (−1 V, 120 ms) triggered an EPSC of −6.43 nA and was observed to decay to a resting current $I_{resting}$≈−0.2 nA within a few seconds because of the back diffusion of anions through the electrolyte (FIG. 9B). In a biological synapse, neural facilitation, that is, paired-pulse facilitation (PPF), evoked by a consecutively applied pair of pulse separated by a short interspike interval Δt potentiates postsynaptic signals. Reduction in Δt amplifies the postsynaptic potentiation (this response is a common property of biological synapses), leading to a short-term synaptic enhancement, for example, strengthening of temporal postsynaptic plasticity in sensory and motor nervous systems. In the artificial synapse, paired pulses with Δt=120 ms amplified the second EPSC peak (A2)~1.34 times compared to the first EPSC peak (A1) (FIG. 9B); this phenomenon is due to the additional anion accumulation as induced by the second pulse, even before the anions accumulated during the first pulse have completely diffused away.

Hence, as the net anion concentration near the NW increased, the EPSC increased correspondingly. As Δt increased, the number of residual anions accumulated by the first peak decreased, so PPF (A2/A1) decreased (FIG. 9C). Again, this response is similar to the PPF of biological synapses.

s-ONWSTs operated stably with various synaptic properties, for example, PPF (A2/A1), SVDP, SNDP, SFDP, and EPSC gain (A10/A1), at 100% strain. These postsynaptic responses are triggered by different presynaptic spike patterns (for example, □t, strength of spikes, number of spikes, and spike frequency) and present features that can be exploited to develop neuroinspired electronics by mimicking the biological synapse. EPSC gain (A10/A1) related to a functional dynamic filtering behavior of a biological synapse was determined by the ratio of the 10th EPSC peak (A10) to the first EPSC peak (A1).

Depending on the applied presynaptic spike voltage (−0.3 to −1 V in increments of −0.1 V), the magnitude of EPSC increased from −1.96 to −6.66 nA; this trend occurred because the increase in voltage subsequently increases the amount of accumulated ions (FIG. 9D).

As the number of applied presynaptic spikes $n_{SPIKE}$ increased from 1 to 50, EPSC increased as a consequence of the growing accumulation of anions (FIG. 9E).

Figure 10A:
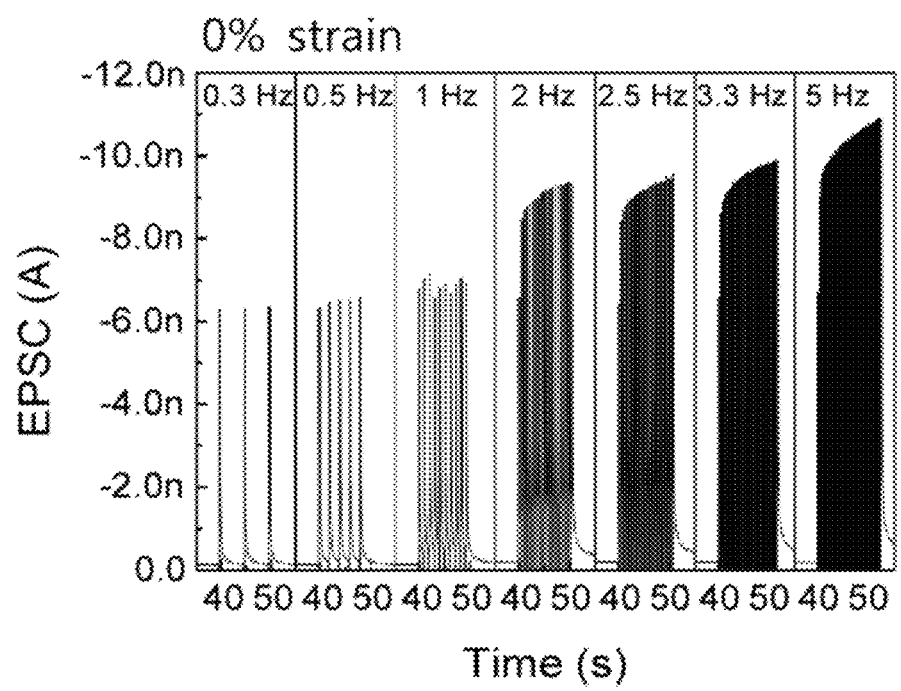
FIG. 10A is a view illustrating EPSCs of artificial synapse with spike frequency from 0.3 to 5 Hz at 0% strain.
Figure 10B:
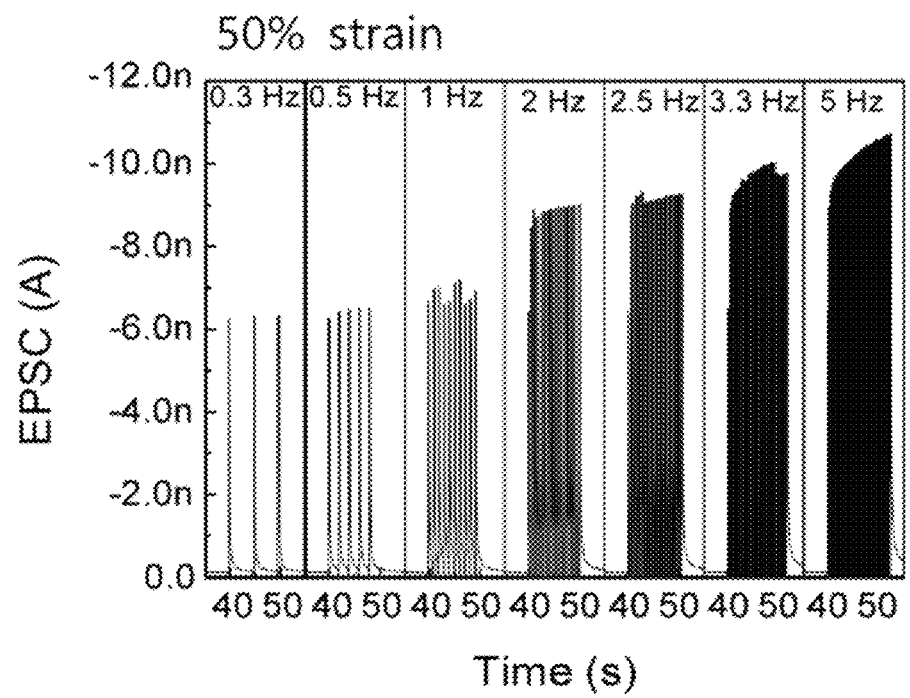
FIG. 10B is a view illustrating EPSCs of artificial synapse with spike frequency from 0.3 to 5 Hz at 50% strain.
Figure 10C:
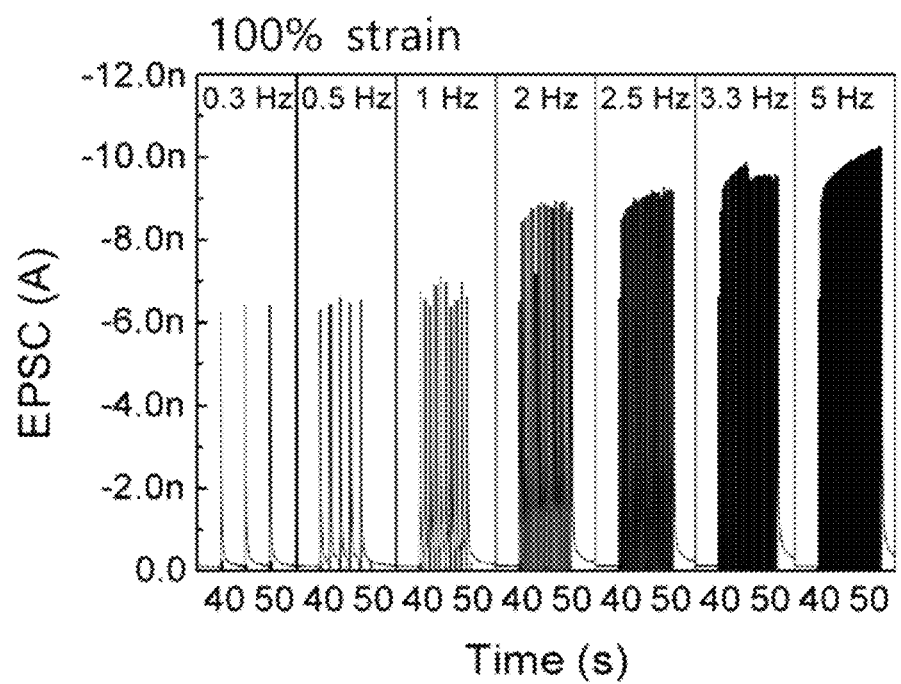
FIG. 10C is a view illustrating EPSCs of artificial synapse with spike frequency from 0.3 to 5 Hz at 100% strain.

FIGS. 10A to 10C are views illustrating SFDP of s-ONWST.

FIG. 10A is a view illustrating EPSCs of artificial synapse with spike frequency from 0.3 to 5 Hz at 0% strain. FIG. 10B is a view illustrating EPSCs of artificial synapse with spike frequency from 0.3 to 5 Hz at 50% strain. FIG. 10C is a view illustrating EPSCs of artificial synapse with spike frequency from 0.3 to 5 Hz at 100% strain.

The frequency of presynaptic signals $F_{SPIKE}$ is responsible for firing postsynaptic signals in the biological synapse. In some example embodiments, fabricated artificial synapse, EPSC increased steadily as $f_{SPIKE}$ increased (FIG. 9F and FIGS. 10A to 10C). As $f_{SPIKE}$ increased and Δt decreased, the EPSC gain (A10/A1) increased gradually from 1.07 to 1.55; this change is again similar to the dynamic high-pass filtering of signal transmission that occurs in biological synapses (FIG. 9G).

Organic Optoelectronic Synapse and Neuromuscular Electronic System FIGS. 11A to 11I are views illustrating Organic optoelectronic synapse and neuromuscular electronic system.

Figure 11A:
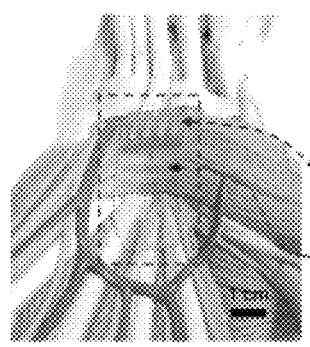
FIG. 11A is a view illustrating Photograph of organic optoelectronic synapse on an internal human structure model.
Figure 11B:
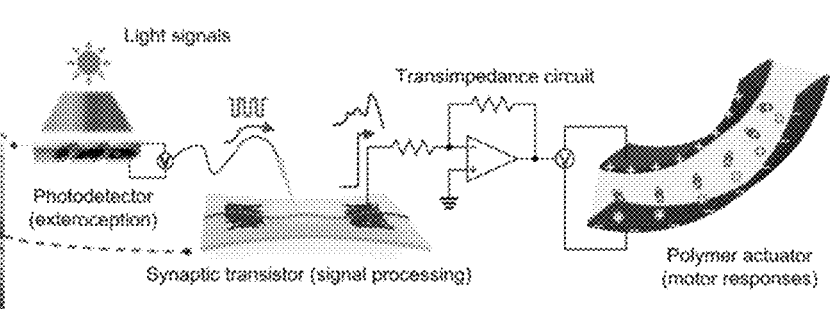
FIG. 11B is a view illustrating Configuration of organic optoelectronic synapse (photodetector and artificial synapse) and neuromuscular electronic system (artificial synapse, transimpedance circuit, and artificial muscle actuator)
Figure 11C:
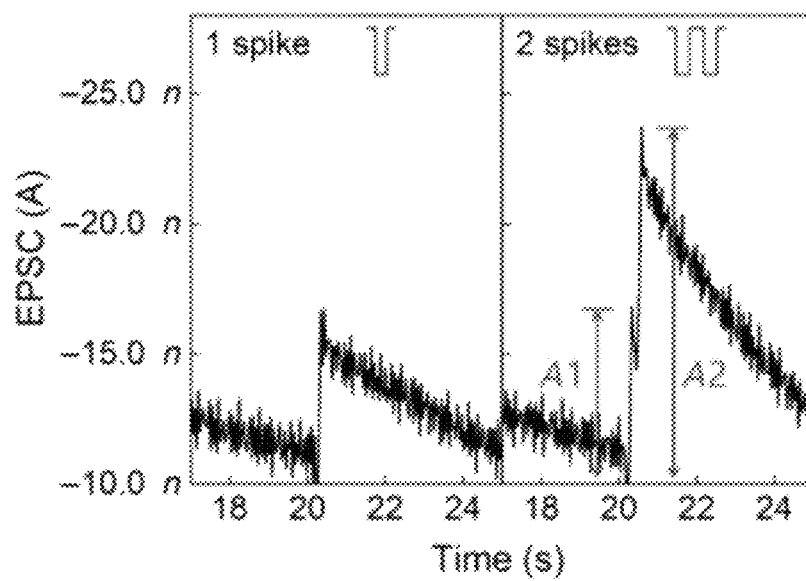
FIG. 11C is a view illustrating EPSCs triggered by single and double visible light spikes (each spike generated presynaptic voltage of −1.1 V for 120 ms)

FIG. 11A is a view illustrating Photograph of organic optoelectronic synapse on an internal human structure model. FIG. 11B is a view illustrating Configuration of organic optoelectronic synapse (photodetector and artificial synapse) and neuromuscular electronic system (artificial synapse, transimpedance circuit, and artificial muscle actuator). FIG. 11C is a view illustrating EPSCs triggered by single and double visible light spikes (each spike generated presynaptic voltage of −1.1 V for 120 ms). PPF (A2/A1) =1.42.

Figure 11D:
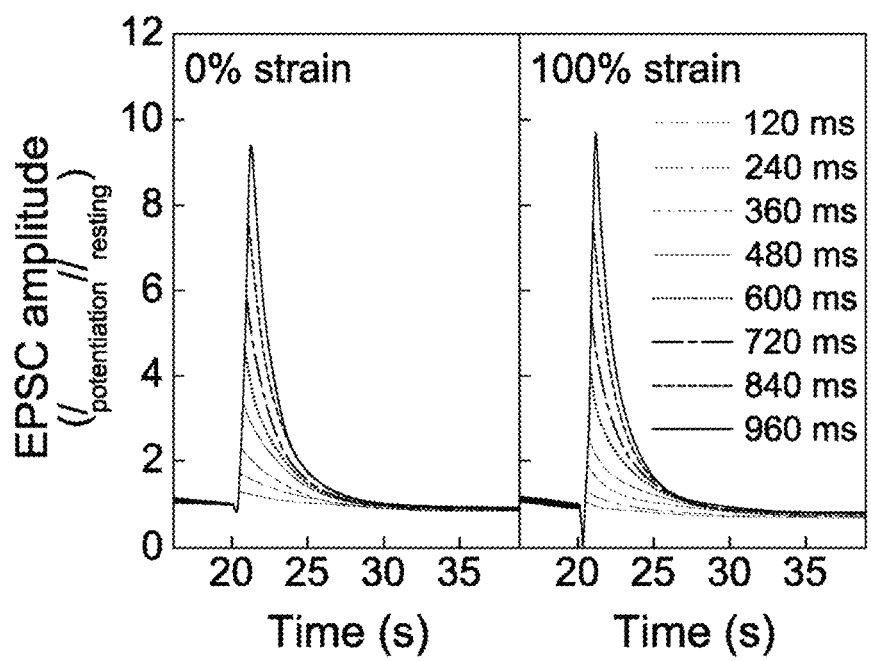
FIG. 11D is a view illustrating SDDP from 120 to 960 ms.
Figure 11E:
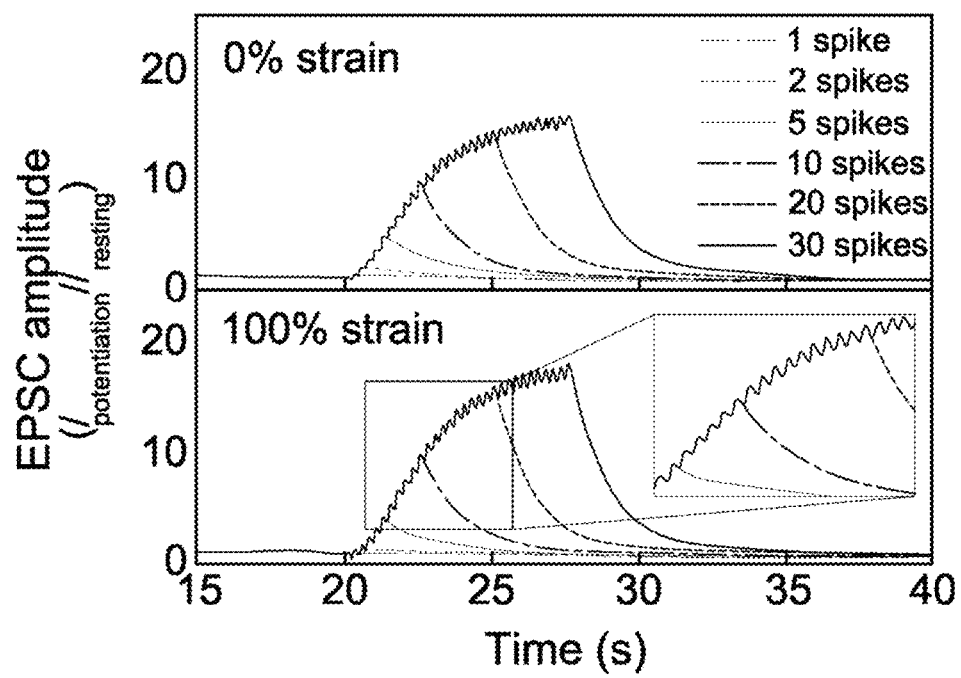
FIG. 11E is a view illustrating SNDP with 1 to 30 spikes.

FIGS. 11D to 11E are views illustrating Visible light-triggered EPSC amplitudes of s-ONWST from 0 to 100% strains.

Figure 11F:
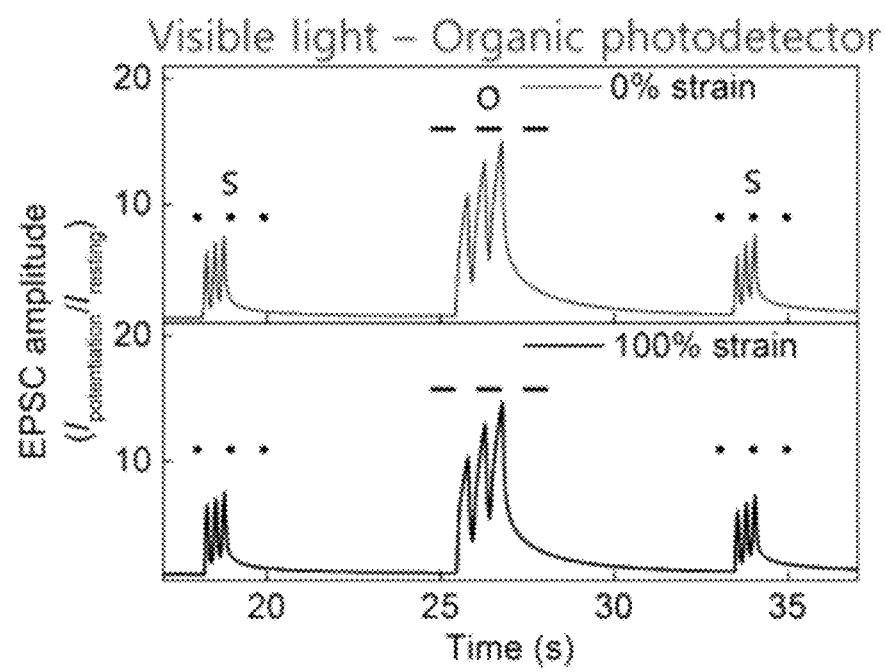
FIG. 11F is a view illustrating Visible light-triggered EPSC amplitudes of s-ONWST with the International Morse code of "SOS," which is the most common distress signal.
Figure 11G:
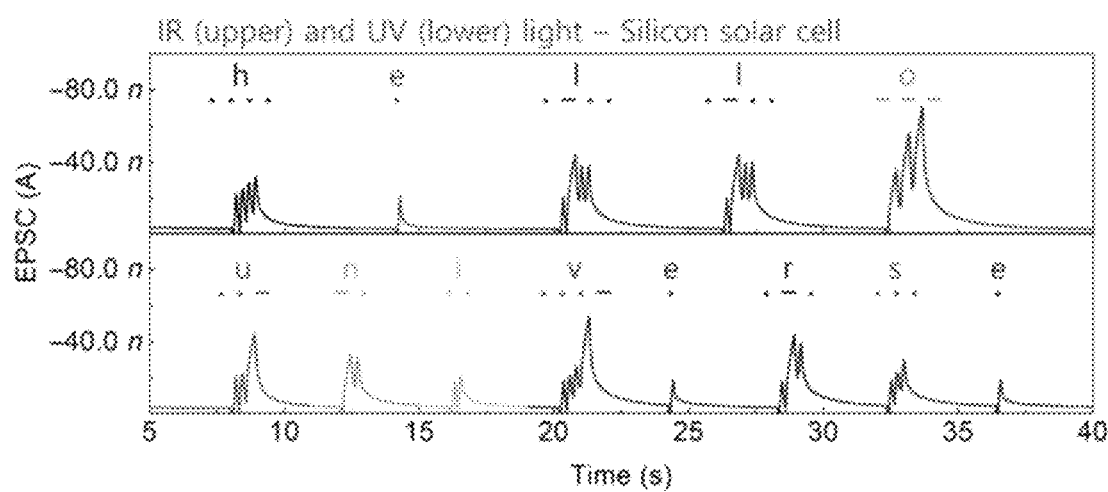
FIG. 11G is a view illustrating Infrared (IR) and ultraviolet (UV) light-triggered EPSC amplitudes of s-ONWST with the International Morse code of "HELLO UNIVERSE"
Figure 11H:
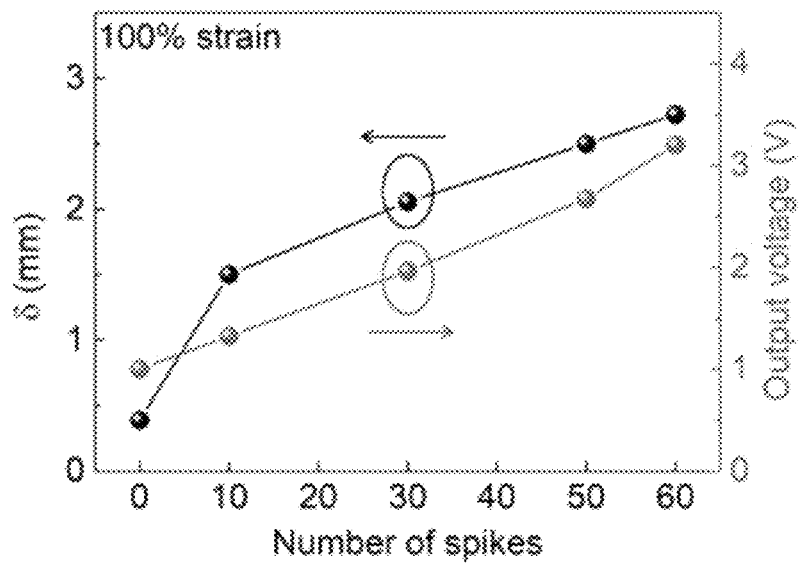
FIG. 11H is a view illustrating Maximum δ of polymer actuator and output voltage generated by s-ONWST according to $0 \leq n_{SPIKE} \leq 60$.
Figure 11I:
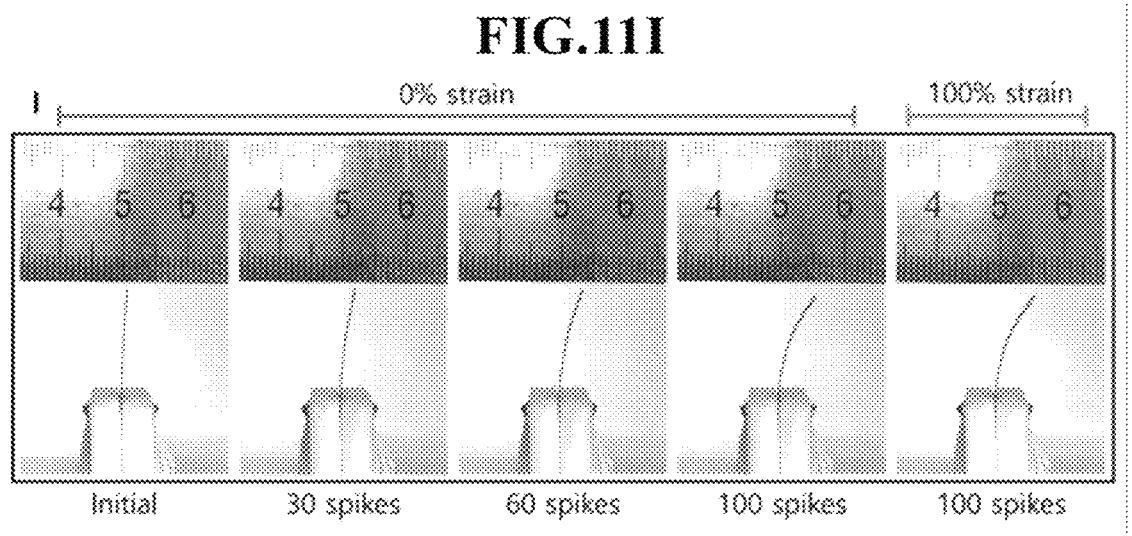
FIG. 11I is a view illustrating digital images of the polymer actuator according to $0 \leq n_{SPIKE} \leq 100$ with 0 or 100% strain.

FIG. 11D is a view illustrating SDDP from 120 to 960 ms.
FIG. 11E is a view illustrating SNDP with 1 to 30 spikes.
FIG. 11F is a view illustrating Visible light-triggered EPSC amplitudes of s-ONWST with the International Morse code of "SOS," which is the most common distress signal. FIG. 11G is a view illustrating Infrared (IR) and ultraviolet (UV) light-triggered EPSC amplitudes of s-ONWST with the International Morse code of "HELLO UNIVERSE". FIG. 11H is a view illustrating Maximum δ of polymer actuator and output voltage generated by s-ONWST according to $0 \leq n_{SPIKE} \leq 60$. FIG. 11I is a view illustrating digital images of the polymer actuator according to $0 \leq n_{PIKE} \leq 100$ with 0 or 100% strain.

Next, an organic optoelectronic synapse was fabricated with a photodetector and s-ONWST (FIGS. 11A and 11B). Exposure to light signal sources causes the photodetector to generate voltage spikes that stimulate the s-ONWST to emit EPSCs. $n_{SPIKE}$ was controlled from 1 to 50, and their duration $d_{SPIKE}$ was varied from 120 to 960 ms. The response time of an organic photodetector is <1 ms (31), which is much smaller than $d_{SPIKE}$=120 ms. Therefore, temporal mismatch between light signals and presynaptic voltage generation is not a problem.

Figure 12:
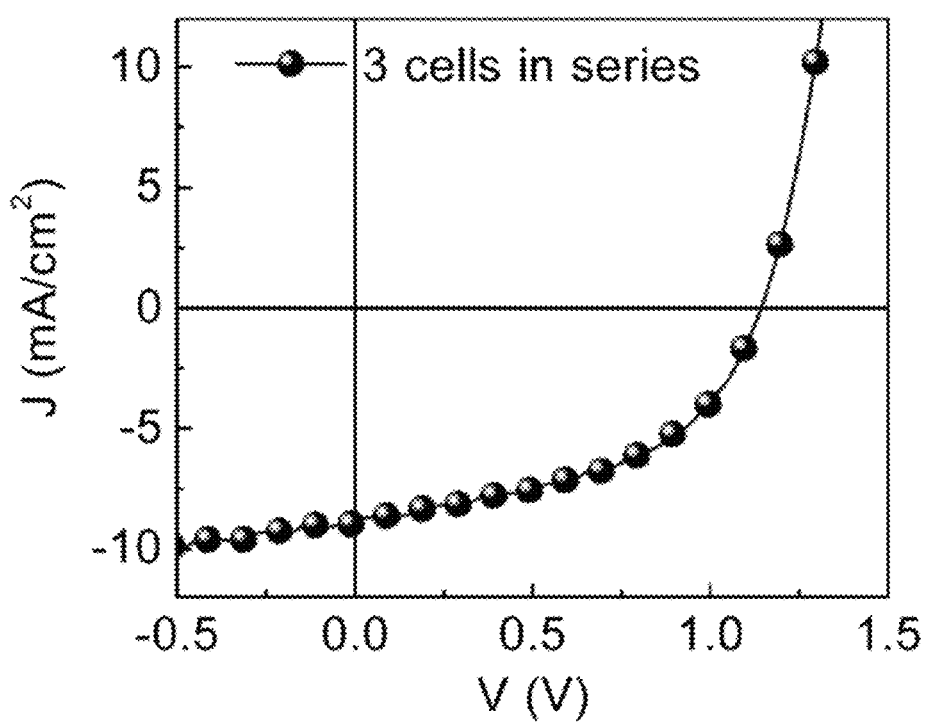
FIG. 12 is a view illustrating Current density-voltage (J-V) characteristics of organic photodetector.

FIG. 12 is a view illustrating Current density-voltage (J-V) characteristics of organic photodetector. Three sub-pixels (total area~0.48 cm2) were connected in series and generated VOC=−1.1 V.

Figure 13A:
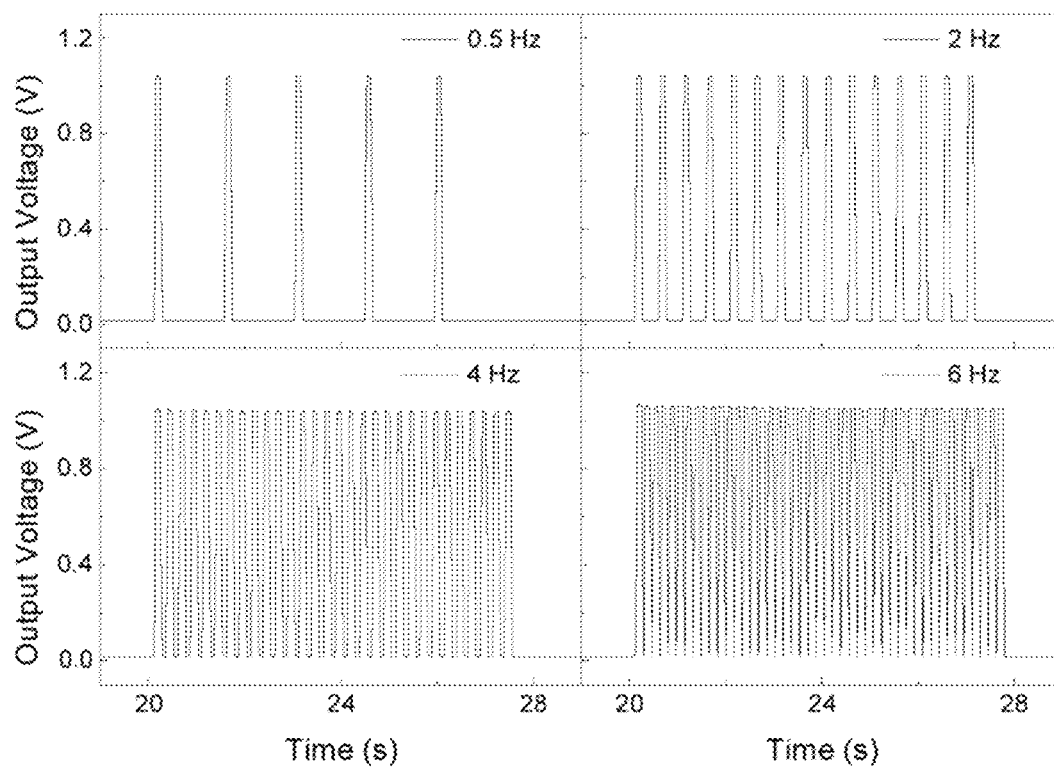
FIG. 13A is a view illustrating Output voltage of the organic photodetector with light-spike frequency from 0.5 to 6 Hz.
Figure 13B:
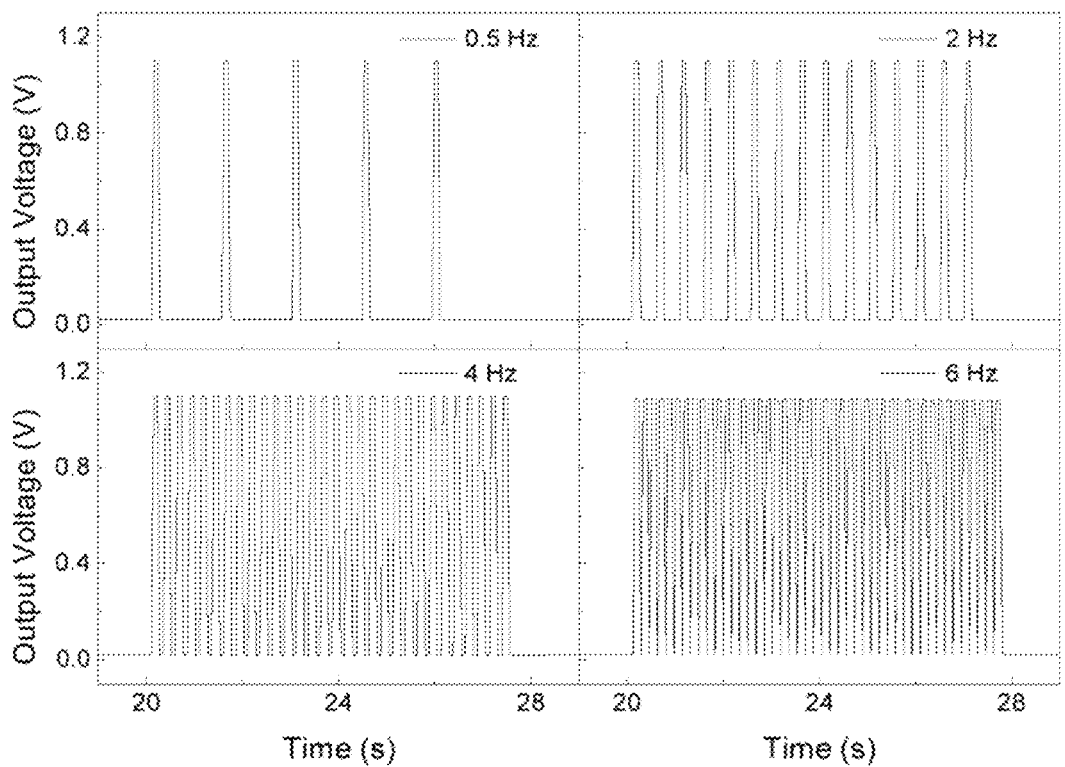
FIG. 13B is a view illustrating Output voltage of the silicon photodetector with light-spike frequency from 0.5 to 6 Hz.

FIGS. 13A and 13B are views illustrating Output characteristics of the photodetectors with different light spike frequency.

FIG. 13A is a view illustrating Output voltage of the organic photodetector with light-spike frequency from 0.5 to 6 Hz. FIG. 13B is a view illustrating Output voltage of the silicon photodetector with light-spike frequency from 0.5 to 6 Hz.

Each visible light pulse induced an output spike voltage of −1.1 V from the organic photodetector (FIG. 12 and FIG. 13A).

A single light spike stimulated an EPSC of −16.7 nA, and double light spikes yielded PPF (A2/A1) of 1.42 (A2=−23.8 nA; A1=−16.7 nA; FIG. 11C). Spike duration-dependent plasticity (SDDP) and SNDP characteristics were similar in the device at 100% strain to those in the device at 0% strain. As $d_{SPIKE}$ was increased from 120 to 960 ms, EPSC amplitude $I_{potentiation}$/Iresting increased from 1.2 to 9.7 (FIG. 11D).

Muscle Contraction and EPSCs of s-ONWST

Figure 14A:
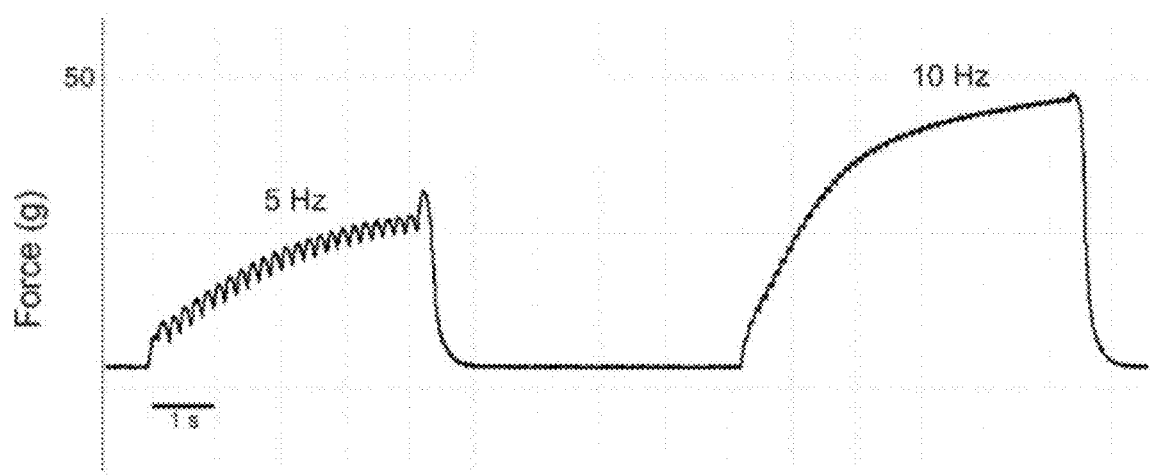
FIG. 14A is a view illustrating Recording of force-frequency of a soleus muscle of a rat.
Figure 14B:
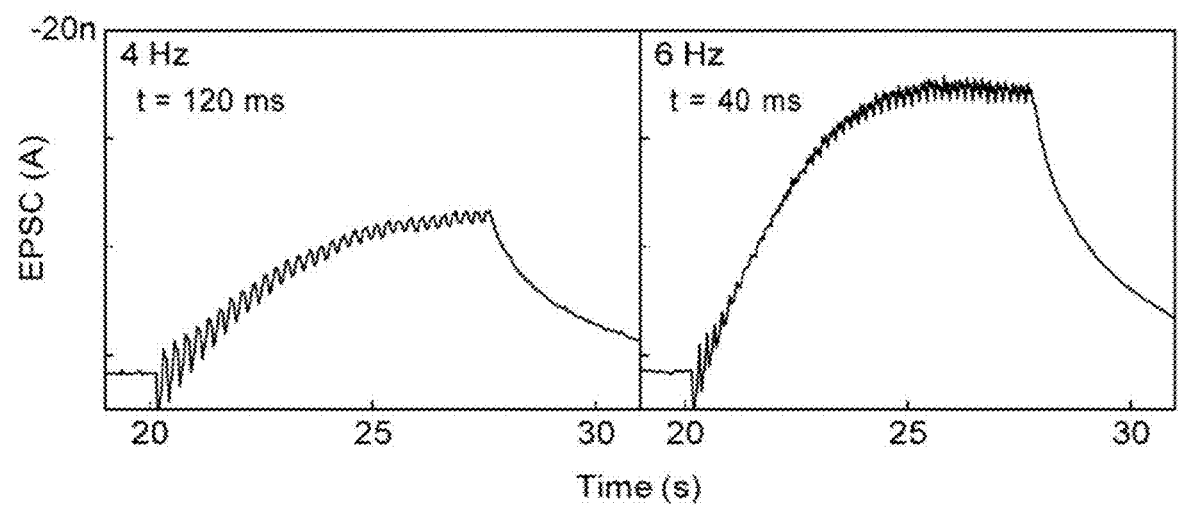
FIG. 14B is a view illustrating EPSCs of s-ONWST with $f_{SPIKE}$=4 Hz (with interspike interval Δt=120 ms) and 6 Hz (with Δt=40 ms) which are similar to fSPIKE-dependent muscle contraction.

FIGS. 14A and 14B are views illustrating Frequency-dependent biological muscle contraction and EPSCs of s-ONWST.

FIG. 14A is a view illustrating Recording of force-frequency of a soleus muscle of a rat.

Reproduced with permission. Mechanical summation and incomplete tetanus with stimulus frequency $f_{SPIKE}$=5 Hz and fused tetanus with $f_{SPIKE}$=10 Hz.

FIG. 14B is a view illustrating EPSCs of s-ONWST with $f_{SPIKE}$=4 Hz (with interspike interval Δt=120 ms) and 6 Hz (with Δt=40 ms) which are similar to fSPIKE-dependent muscle contraction.

According to the number and frequency of action potentials, skeletal muscle is activated in four ways: twitch, summation, incomplete tetanus, and complete tetanus. A twitch is a small contraction and relaxation; the combination is induced by a single impulse, and is similar to a single EPSC in an s-ONWST. If two impulses arrive within short interval, muscle contraction increases because the second contraction is added before the first contraction is completely released; this condition is similar to the paired-pulse facilitations in an s-ONWST. As the number of impulses increases, muscle contractions increase; this is incomplete tetanus and is analogous to the gradual increase of EPSCs in an s-ONWST. When action potentials occur very frequently, consecutive twitches fuse; the result is continuous muscle contraction, which is complete tetanus. When an s-ONWST is stimulated with small interspike interval ☐t in the same period, EPSCs increased almost linearly then saturated; this response curve resembles tetanus (FIGS. 14A and 14B).

As $n_{SPIKE}$ increased, EPSC amplitude increased linearly until $n_{SPIKE}$=10 (FIG. 11E); at $n_{SPIKE}$>10, the increase gradually slowed to an asymptote (FIG. 11E). These behaviors are analogous to biological muscle tension responses during contractions of twitch, summation, and incomplete tetanus (FIGS. 14A and 14B).

Therefore, organic neuromuscular electronic system emulates a biological neuromuscular system well.

Figure 15:
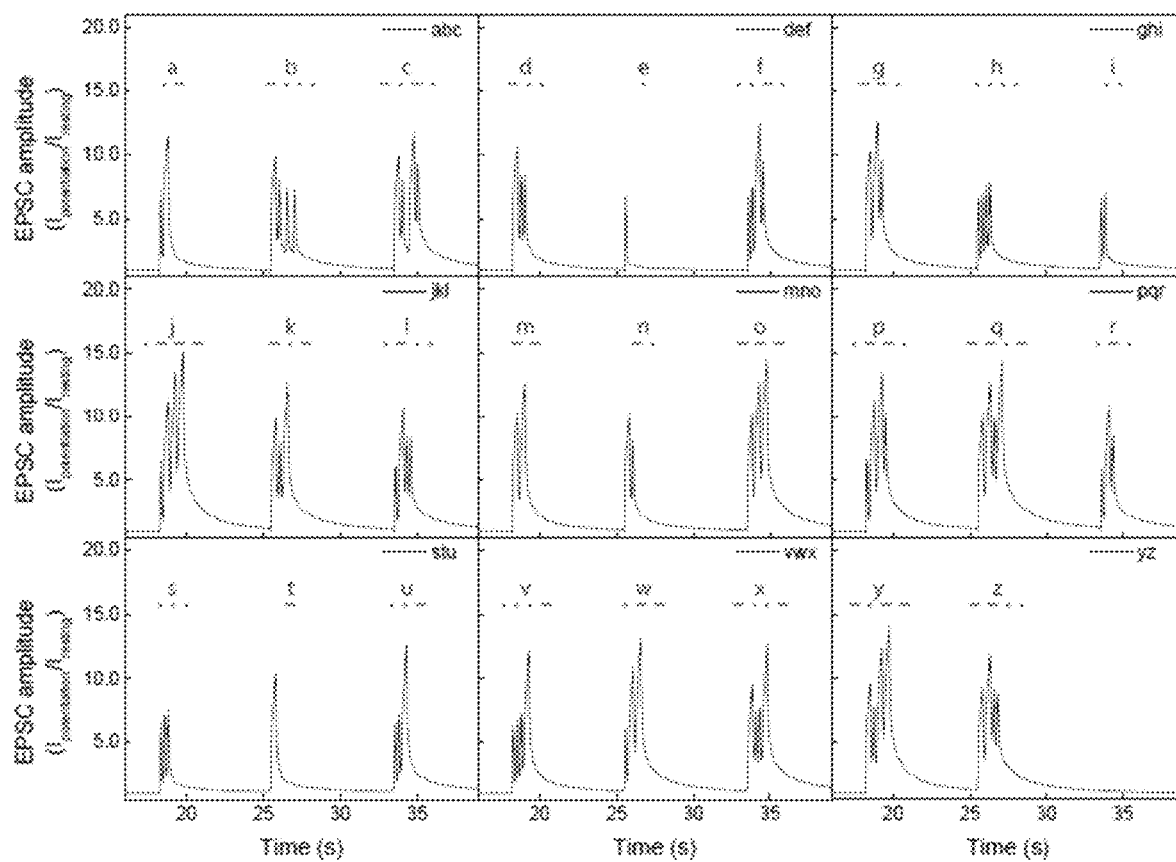
FIG. 15 is a view illustrating a novel optical wireless communication method of human-machine interface.

FIG. 15 is a view illustrating a novel optical wireless communication method of human-machine interface.

Visible light-triggered EPSC amplitude of s-ONWST with International Morse code. Every letter produces a distinct EPSC amplitude response.

To demonstrate the potential of our organic optoelectronic synapse as an optical wireless communication method for human-machine interfaces, we showed that the s-ONWST can react to patterns of visible light that represent the International Morse code, in which every letter of the English alphabet can induce a distinct EPSC amplitude response (FIG. 15).

Figure 16:
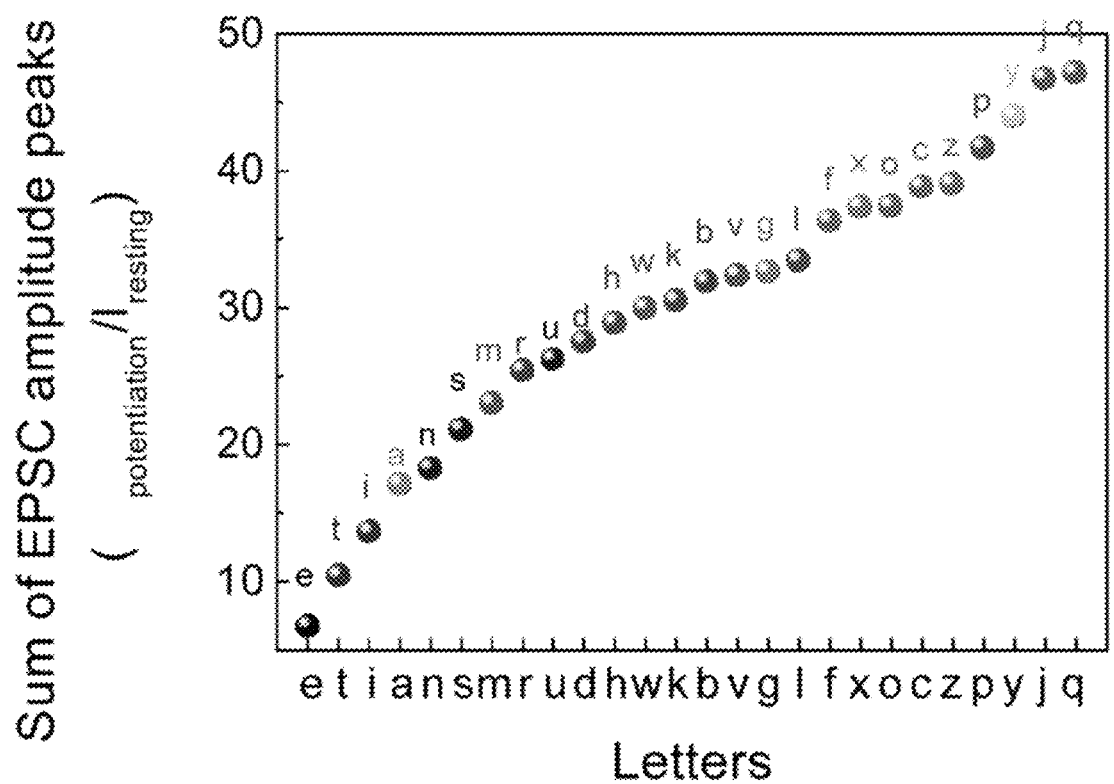
FIG. 16 is a view illustrating Correlation between EPSC amplitude response and the International Morse code of English letters.

FIG. 16 is a view illustrating Correlation between EPSC amplitude response and the International Morse code of English letters.

Every letter was linearly correlated with the sum of EPSC amplitude peak values (FIG. 16). "SOS," representing the standard emergency signal, was expressed with EPSC amplitude of an artificial synapse at both 0 and 100% strains (FIG. 11F); stretching the device did not result in any notable changes in its response. In addition to visible light, we input short messages ("HELLO" and "UNIVERSE") by using invisible infrared (940 nm) and ultraviolet (365 nm) light and a silicon solar cell (FIG. 11G and FIG. 13B). These EPSC responses showed that our system can be applied to light fidelity in the future. We are now applying this communication method toward remote control of a bioinspired artificial muscle.

Figure 17:
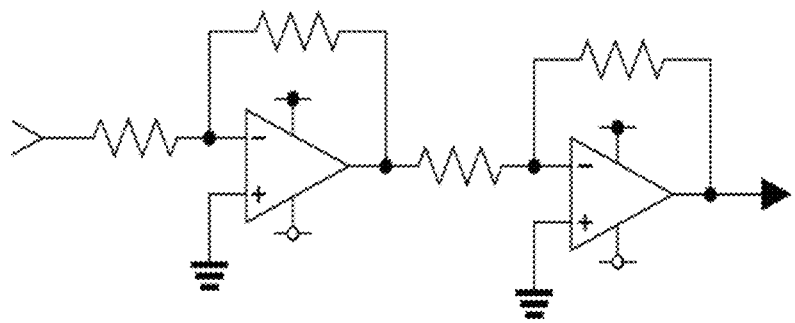
FIG. 17 is a Full circuit diagram of transimpedance circuit.

FIG. 17 is a Full circuit diagram of transimpedance circuit.

The circuit was developed on a breadboard with R1 (1 MΩ), R2 (10 MΩ), R3 (1 kΩ), R4 (10 kΩ) and two dual-supply operational amplifiers (CA3130).

Last, a complete neuromuscular electronic system was assembled by connecting an s-ONWST to a polymer actuator through a transimpedance circuit (FIG. 17). EPSCs from the organic optoelectronic synapse were converted to voltage signals to operate In some example embodiments, fabricated polymer actuator. The low voltage-driven polymer actuator was composed of imidazole (Im)-doped poly (styrenesulfonate-b-methylbutylene) (PSS-b-PMB) block copolymers, a zwitterion of 3-(1-methyl-3-imidazolium) propanesulfonate, and CNT electrodes that had been fabricated as reported previously.

Figures 18, 19:
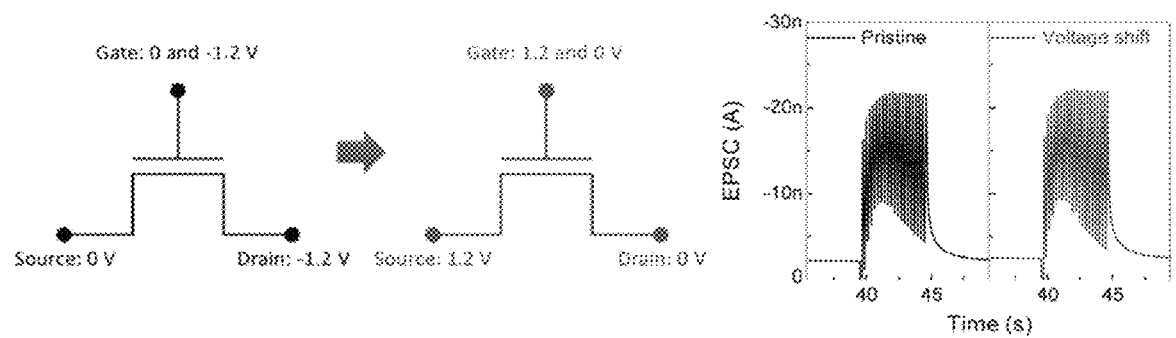
FIG. 18 is a view illustrating Operating voltage shift of s-ONWST to connect the transimpedance circuit.
FIG. 19 is Table 4 illustrating Maximum δ of polymer actuator and output voltage generated by s-ONWST according to the number of light spikes.

FIG. 18 is a view illustrating Operating voltage shift of s-ONWST to connect the transimpedance circuit.

Pristine applied voltage for each source and drain electrode of s-ONWST is 0 and −1.2 V, and gate voltages are 0 V for resting state and −1.2 V for spike. To operate the polymer actuator, the drain electrode was connected to the trans-impedance circuit, so this electrode could not apply the drain voltage. Therefore the applied voltage for each electrode was shifted while maintaining overall potential (source voltage: 1.2 V, drain voltage: 0 V, gate voltage: 1.2 V for resting state and 0 V for spike). The pristine and shifted operating condition generated almost the same EPSC characteristics.

S/D voltage was applied to the source electrode of the artificial synapse, rather than to the drain electrode (FIG. 18).

This connection was necessary because the drain electrode was connected to the circuit to convert currents to output voltages, such that the polymer actuator can be operated. We used the organic photodetector and visible light in this system. Before the device was illuminated, the $I_{resting}$ of the artificial synapse generated a small voltage (~1 V), which resulted in a slight contraction of the artificial muscle (FIGS. 11H and 11I).

When short pulses of light were applied, the EPSCs were converted to voltages to operate the actuator. The output voltage and displacement δ of the actuator all increased as $n_{SPIKE}$ increased (FIGS. 11H and 11I).

FIG. 19 is Table 4 illustrating Maximum δ of polymer actuator and output voltage generated by s-ONWST according to the number of light spikes.

Specifically, δ with 10 spikes at 1.5 mm was increased to 2.7 mm with 60 spikes as the output voltage was increased from 1.3 to 3.2 V (FIG. 11H and FIG. 19).

The polymer actuator operated stably with s-ONWST at both 0 and 100% strains; it had δ=5.3 and 5.4 mm, respectively, after 100 spikes (FIG. 11I and movie 51). Direct connection of the polymer actuator and the voltage source without the artificial synapse can produce constantly very small δ (<100 μm) in the actuator at low voltages, but not a gradual increase of actuation upon repeated voltage pulses. These results collectively demonstrated that some example embodiments, fabricated organic optoelectronic sensorimotor synapse is a viable platform for optical stimulation to actuate artificial muscle remotely, which mimics the biological muscle tension response during contraction with action potentials.

We have demonstrated the first neurologically inspired organic optoelectronic sensorimotor synapse using an organic optoelectronic synapse and a neuromuscular system based on s-ONWST. This synapse has potential to be an element in an artificial sensorimotor nervous system of soft electronics and neurorobotics. Some example embodiments, highly robust s-ONWSTs showed stable I-V characteristics and various typical postsynaptic behaviors, including EPSC, PPF, SVDP, SNDP, SFDP, and high-pass filtering at both 0 and 100% strains. Some example embodiments, s-ONWSTs can be further used as organic optoelectronic synapses that exploit the output voltage of a photodetector by converting light signals to presynaptic spikes to trigger postsynaptic potentiation of the artificial synapse. This organic optoelectronic synapse then actuated an artificial muscle; this motor response in some example embodiments, neuromuscular system is analogous to the biological muscle tension responses during contraction. Patterned light signals can successfully convey Morse code onto the s-ONWST; this ability suggests a novel potential optical wireless communication of light fidelity for human-machine interfaces. This combination of relevant functionalities of optics, electronics, and biological technology demonstrates that some example embodiments, organic optoelectronic sensorimotor synapse represents a promising strategy for the development of next-generation biomimetic soft electronics, soft robotics, neurorobotics, and electronic prostheses.

Materials and Methods

Electrospinning of Single FT4-DPP-Based Polymer NW

An FT4-DPP-based polymer poly[(3,7-bis(heptadecyl) thieno[3,2-b]thieno[2',3':4,5]thieno[2,3-d]thiophene-5,5'-diyl)(2,5-bis(8-octyloctadecyl)3,6-di(thiophen-2-yl)pyrrolo [3,4-c]pyrrole-1,4(2H,5H)-dione-5,5'-diyl)] (Mw: 33,000 g/mol; PDI: 2, Corning Inc.) and PEO [$M_W$=400,000 g/mol (7:3, w/w); (Sigma-Aldrich)] were dissolved in chloroform. A homogeneous and viscous solution was achieved after magnetic stirring for 2 hours at 500 rpm and 50° C. Electrospinning was conducted at an applied voltage of 3 kV, tip-to-collector distance of 15 cm, and a solution feeding rate of 1 μl/min. During electrospinning, single NWs were aligned between parallel electrodes.

Fabrication of Stretchable Synaptic Transistor

S/D electrodes of single-wall CNTs (SWCNTs) were spray-coated on $SiO_2$/Si substrate and transferred on SEBS substrate. The single aligned NW was transferred onto a prestretched SEBS substrate, and then, the tension on the substrate was released slowly. Ion gel gate dielectric composed of poly(styrene-b-methyl methacrylate-b-styrene) (PS-PMMA-PS) triblock copolymer and 1-ethyl-3-methyl-imidazolium bis(trifluoromethylsulfonyl)imide ([EMIM] [TFSI]) ionic liquid dissolved in ethyl acetate (0.7:9.3:90, w/w) was drop-cast on the FT4-DPP-based polymer NW. The device was dried under vacuum for 6 hours to remove the solvent, and then, the device's electrical characteristics were measured in a glove box filled with $N_2$.

Fabrication of Organic Photodetector

Bulk heterojunction inverted organic photovoltaic was fabricated. ZnO layer (30 nm) was formed by spin-coating of ZnO precursor solution of zinc acetate dihydrate (Zn $(CH_3COO)_2.2H_2O$) (Sigma-Aldrich) and 2-methoxyethanol ($CH_3OCH_2CH_2OH$) (Sigma-Aldrich) on the indium tin oxide substrate. The mixture solution of P3HT (SigmaAldrich) and [6,6]-phenyl-C(61)-butyric acid methyl ester ($PC_{60}BM$) (Sigma-Aldrich) in chlorobenzene was spin coated (150 nm) on the ZnO layer. Then, poly(3,4-ethylenedioxythiophene) doped with poly(4styrenesulfonate) (CLEVIOS AI4083) was coated (40 nm) as a hole extraction layer and then annealed at 150° C. for 10 min. Ag (100 nm) was thermally deposited as an anode under high vacuum. To achieve large output presynaptic voltage with magnitude greater than −1 V, three subpixels (total area, ~0.48 $cm^2$) were connected in series; the combination generated VOC=−1.1 V when photostimulation was applied from a commercial white light-emitting diode (LED) bulb (Solarzen T10 5450 3 chip 4P) connected to a semiconductor parameter analyzer (Keysight B1500) that makes patterned voltage spikes. A commercial silicon solar cell was used to detect light from commercial infrared (940 nm) and ultraviolet (365 nm) LEDs.

Fabrication of Polymer Actuator

A sulfonated block copolymer and zwitterion were synthesized, and the polymer actuator was fabricated as described previously (16). To prepare PSS-b-PMB block copolymer doped with Im, 5 weight % (wt %) Im and PSS-b-PMB block copolymer mixture was dissolved in methanol. Im-doped polymers were achieved by solution casting and vacuum drying. Im-doped polymers were redissolved in a solvent mixture (4:1, v/v) of methanol and tetrahydrofuran, and then, zwitterions were added to the mixed solution. An aluminum mold (1 cm by 1.5 cm) was used to prepare polymer membranes by solution casting in Ar atmosphere for 2 days at room temperature, and then, polymer films were dried in vacuum at 70° C. for a week. The polymer membranes were pressed at 200 kgf cm$^{-2}$ at 25° C. for 1 hour. SWCNT electrodes contain 1-ethyl-3-methylimidazolium tetrafluoroborate ([EMIM][BF4]) (Sigma-Aldrich), poly(vinylidene fluorideco-hexafluoropropylene) (Kynar Flex 2801, Arkema Chemical Inc.), and SWCNTs (Sigma-Aldrich) (2.5:1.5:1.0, w/w). To achieve the polymer actuators, the polymer membrane was sandwiched with 10-☐m-thick SWCNT electrodes by hot pressing. The actuators measured 19 mm by 1 mm by 90 μm.

Characterization

The electrical characteristics of s-ONWST were measured using a semiconductor parameter analyzer (Keithley 4200 and Keysight B1500) under N$_2$ in a glove box, and the response for the International Morse code was measured under ambient conditions. The morphology of ONW was measured using an optical microscope (Leica DM4000M), a scanning electron microscope (FEI XL30 Sirion), and a transmission electron microscope (FEI Tecnai F20 at 200 kV). The chemical composition of ONW was determined using an energy dispersive x-ray spectroscope (FEI Tecnai F20 at 200 kV).

While the example embodiments of the present invention and their advantages have been described in detail, it should be understood that various changes, substitutions and alterations may be made herein without departing from the scope of the invention.

What is claimed is:

1. A stretchable organic optoelectronic sensorimotor synapse, comprising:
   a photodetector triggered by optical signals to generate voltage pulses; and
   a stretchable organic nanowire synaptic transistor (s-ONWST) driven by the voltage pulses to generate resultant informative synaptic outputs.

2. The stretchable organic optoelectronic sensorimotor synapse of claim 1, wherein the s-ONWST, combined with the photodetector being self-powered, converts patterned optical stimuli into potentiated synaptic responses to conduct optical wireless communication of light fidelity.

3. The stretchable organic optoelectronic sensorimotor synapse of claim 2, wherein the photodetector is stimulated by optical pulses of wavelengths in infrared, visible, and ultraviolet regions,
   the s-ONWSTs generates typical excitatory postsynaptic currents (EPSCs) when triggered by patterns of optical signals as presynaptic impulses, and
   optical wireless signals for the wireless communication subsequently generate output voltage pulses that are applied to s-ONWSTs as presynaptic spikes to trigger EPSCs.

4. The stretchable organic optoelectronic sensorimotor synapse of claim 3, wherein patterned light signals can successfully convey Morse code onto the s-ONWST.

5. The stretchable organic optoelectronic sensorimotor synapse of claim 2, wherein the s-ONWSTs comprises:
   a gate electrode electrically connected to the photodetector;
   organic nanowires; and
   an ion-gel electrolyte between the gate electrode and the organic nanowires,
   wherein presynaptic electrical impulse was transmitted from the gate electrode to the organic nanowires (ONWs), and the impulse transmission is a consequence of ion migration in the ion-gel electrolyte that generates postsynaptic electrical responses.

6. The stretchable organic optoelectronic sensorimotor synapse of claim 5, wherein the s-ONWST emulates a motor neuron and a neuromuscular junction,
   the ONW has similar morphology to the biological neuron, which has a thin and flexible axon,
   the gate electrode mimics the presynaptic membrane, and
   the ion-gel electrolyte mimics the synaptic cleft.

7. The stretchable organic optoelectronic sensorimotor synapse of claim 6, wherein presynaptic gate voltage spike induces migration of mobile anions near the ONW surface, which corresponds to the postsynaptic membrane,
   the accumulated anions attract holes to the ONW where they increase the excitatory postsynaptic current (EPSC) that flows between source and drain electrodes,
   when a single short spike voltage is applied, a sharp EPSC peak is triggered, which decays to a resting current,
   if several spikes are applied in quick succession, ions accumulate near the surface of ONW, so EPSC increases gradually, and
   after spikes, accumulated anions spread back and become dispersed randomly in the electrolyte, as a result, the original resting current is restored.

8. The stretchable organic optoelectronic sensorimotor synapse of claim 6, wherein an artificial synaptic cleft of the ion gel electrolyte is ionically conducting and electronically insulating, so the ions can migrate to the ONW channel upon presynaptic gate voltage spikes to result in an increase in postsynaptic drain current.

9. The stretchable organic optoelectronic sensorimotor synapse of claim 1, wherein the s-ONWST, combined with the photodetector being self-powered, converts patterned optical stimuli into potentiated synaptic responses to forms an artificial neuromuscular junction to activate artificial muscle actuator with biomimetic muscular contraction mechanism.

10. The stretchable organic optoelectronic sensorimotor synapse of claim 1, wherein the s-ONWSTs provides stable I-V characteristics and typical postsynaptic behaviors, including excitatory postsynaptic currents (EPSCs), paired-pulse facilitation (PPF), spike voltage-dependent plasticity (SVDP), spike number-dependent plasticity (SNDP), spike frequency-dependent plasticity (SFDP), and high-pass filtering at both 0 and 100% strains.

* * * * *